(12) United States Patent
Barak et al.

(10) Patent No.: US 12,219,453 B2
(45) Date of Patent: Feb. 4, 2025

(54) DYNAMIC COMMUNICATION ROUTING BASED ON CONSISTENCY WEIGHTING AND ROUTING RULES

(71) Applicant: LIVEPERSON, INC., New York, NY (US)

(72) Inventors: Matan Barak, Ra'anana (IL); Efim Dimenstein, Bnei Atarot (IL); Shlomo Lahav, Ramat-Gan (IL)

(73) Assignee: LIVEPERSON, INC., New York, NY (US)

( * ) Notice: Subject to any disclaimer, the term of this patent is extended or adjusted under 35 U.S.C. 154(b) by 135 days.

(21) Appl. No.: 18/123,528

(22) Filed: Mar. 20, 2023

(65) Prior Publication Data

US 2023/0232305 A1    Jul. 20, 2023

Related U.S. Application Data

(63) Continuation of application No. 17/095,320, filed on Nov. 11, 2020, now Pat. No. 11,638,195, which is a
(Continued)

(51) Int. Cl.
| | |
|---|---|
| *H04W 76/10* | (2018.01) |
| *G06Q 10/107* | (2023.01) |
| *G06Q 30/01* | (2023.01) |
| *G06Q 30/02* | (2023.01) |
| *H04W 8/26* | (2009.01) |
| *H04W 40/02* | (2009.01) |
| *H04W 88/02* | (2009.01) |

(52) U.S. Cl.
CPC .......... *H04W 40/02* (2013.01); *G06Q 10/107* (2013.01); *G06Q 30/01* (2013.01); *G06Q 30/02* (2013.01); *H04W 8/26* (2013.01); *H04W 76/10* (2018.02); *H04W 88/02* (2013.01)

(58) Field of Classification Search
CPC ....... H04W 40/02; H04W 76/10; H04W 8/26; G06Q 10/107; G06Q 30/01; G06Q 30/02
USPC ......................................................... 370/329
See application file for complete search history.

(56) References Cited

U.S. PATENT DOCUMENTS

2014/0094134 A1* 4/2014 Balthasar ............ H04M 3/5235
379/47

FOREIGN PATENT DOCUMENTS

JP        2010287024 A  * 12/2010

* cited by examiner

*Primary Examiner* — Christopher R Crompton
(74) *Attorney, Agent, or Firm* — POLSINELLI LLP

(57) ABSTRACT

Systems and methods for dynamic communication routing based on consistency weighting and routing rules are disclosed. A computing device can receive a communication including content data. The communication can be stored in a queue position of a primary queue. For example, the primary queue can include a plurality of queue positions for storing communications. The communication can be retrieved from the queue position of the primary queue and analyzed. In some instances, analyzing can include parsing the content data for a keyword. A keyword can correspond to a secondary queue. When the keyword is identified in the communication, the communication can be stored in the secondary queue that corresponds to the keyword. A terminal device associated with the secondary queue can be identified. A retrieval request to access the communication from the secondary queue can be received, and the communication can be routed to the terminal device.

21 Claims, 21 Drawing Sheets

Related U.S. Application Data continuation of application No. 16/166,297, filed on Oct. 22, 2018, now Pat. No. 10,869,253, which is a continuation of application No. 15/171,525, filed on Jun. 2, 2016, now Pat. No. 10,142,908.

(60) Provisional application No. 62/169,726, filed on Jun. 2, 2015.

DYNAMIC COMMUNICATION ROUTING BASED ON CONSISTENCY WEIGHTING AND ROUTING RULES

CROSS REFERENCE TO RELATED APPLICATIONS

This application is a continuation of U.S. patent application Ser. No. 17/095,320 filed Nov. 11, 2020, which is a continuation of U.S. patent application Ser. No. 16/166,297 filed Oct. 22, 2018, which is a continuation of U.S. patent application Ser. No. 15/171,525 filed Jun. 2, 2016, which claims the benefit of U.S. Provisional Application No. 62/169,726, filed Jun. 2, 2015, the disclosure of each of which is incorporated by reference herein in its entirety for all purposes.

FIELD

The present disclosure relates generally to intelligent routing of communications. More specifically, techniques are provided to conditionally route communications for a given client to a consistent terminal device.

BACKGROUND

The number of electronic or telephonic communications being generated is growing at an unprecedented rate. Various devices can facilitate in providing responses to such communications. However, the quality and speed of such responses can vary across devices. Further, while one device may be configured to provide a relative high-quality and fast response to one communication, a different device may be configured to provide such a relative high-quality and fast response to another communication. Accordingly, it is important to promote strategic routing.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a computer-implemented method for routing communications. The method may include receiving, at a computing device, a communication including content data, and storing the communication in a primary queue. In some instances, the primary queue may include a plurality of queue positions for storing a plurality of communications. The communication may be stored at a queue position of the plurality of queue positions in the primary queue. The method may also include retrieving the communication from the queue position of the primary queue; and analyzing the communication. In some instances, analyzing the communication may include parsing the content data for a keyword. For example, the keyword may correspond to a secondary queue. Further, the method may include storing the communication in the secondary queue. The secondary queue may be associated with one or more terminal devices. The method may also include identifying a terminal device associated with the secondary queue. Further, the method may include receiving a retrieval request that requests access to the communication; and routing the communication to the terminal device. For example, routing the communication may include establishing a communication link between the terminal device and a network device associated with the communication.

Embodiments of the present disclosure may also include a system for routing communications. The system may include one or more processors, and a non-transitory computer-readable storage medium containing instructions which, when executed on the one or more data processors, cause the one or more data processors to perform operations including the computer-implemented method for routing communications described above and herein.

Embodiments of the present disclosure may also include a computer-program product tangibly embodied in a non-transitory machine-readable storage medium, including instructions configured to cause a data processing apparatus to perform operations including the computer-implemented method for routing communications described above and herein.

Additional embodiments of the present disclosure may include a computer-implemented method for performing tasks. The computer-implemented method may include receiving, at a computing device, an initial communication from a network device; and identifying a terminal device. The terminal device may be identified using the initial communication. The terminal device may be associated with an entity. The computer-implemented method may also include establishing a communication link between the network device and the terminal device; and facilitating a communication session between the network device and the terminal device. In some instances, facilitating the communication session may include exchanging one or more messages between the network device and the terminal device over the established communication link. Further, the method may include receiving an initial message; and determining an initial message parameter for the initial message. For example, the initial message parameter may be determined in real-time when the initial message is received. The initial message parameter may be indicative of a message characteristic associated with the initial message. The method may also include determining a conversation parameter for a plurality of messages associated with the communication session. The conversation parameter may be determined using the initial message parameter and one or more additional message parameters. The conversation parameter may be updated in real-time as the one or more additional message parameters are generated. Further, the conversation parameter may be indicative of a conversation characteristic associated with the plurality of messages. The method may also include performing a task based on the message parameter or the conversation parameter.

Embodiments of the present disclosure may also include a system. The system may include one or more processors, and a non-transitory computer-readable storage medium containing instructions which, when executed on the one or more data processors, cause the one or more data processors to perform operations including the computer-implemented method for performing tasks described above and herein.

Embodiments of the present disclosure may also include a computer-program product tangibly embodied in a non-transitory machine-readable storage medium, including instructions configured to cause a data processing apparatus to perform operations including the computer-implemented method for performing tasks described above and herein.

Additional embodiments of the present disclosure may include a method for dynamically routing electronic messages based on consistency and latency variables. The method may include: receiving a message from a network device; determining that the message is associated with a client; and identifying a terminal device that previously communicated with the network device via an exchange of messages routed through a communication channel. The terminal device may include one associated with the client. The method may also include determining whether an agent associated with the terminal device is available to respond to the message. In some instances, when it is determined that the agent is not available to respond to the message, the method may include predicting a response latency indicative of a delay of a response to the message should the message be routed to the terminal device; and determining whether agent consistency outweighs facilitating a faster response latency. When it is determined that the agent consistency outweighs facilitating the faster response latency, the method may include routing the message to the terminal device; and facilitating an asynchronous communication exchange between the terminal device and network device. When it is determined that the agent consistency does not outweigh facilitating the faster response latency, the method may include identifying a new terminal device associated with the client; and routing the message to the new terminal device through a new communication channel.

Embodiments of the present disclosure may also include a system for routing communications. The system may include one or more processors, and a non-transitory computer-readable storage medium containing instructions which, when executed on the one or more data processors, cause the one or more data processors to perform operations including the method for dynamically routing electronic messages based on consistency and latency variables described above and herein.

Embodiments of the present disclosure may also include a computer-program product tangibly embodied in a non-transitory machine-readable storage medium, including instructions configured to cause a data processing apparatus to perform operations including the method for dynamically routing electronic messages based on consistency and latency variables described above and herein.

Additional embodiments of the present disclosure may include a method of conditionally establishing continuous channels for routing messages. The method may include: facilitating routing a series of messages between a network device and a terminal device, and accessing a continuous-channel rule that includes a condition. The series of messages may be associated with times that are clustered along a time dimension, and the series of messages may correspond to a client. Further, the continuous-channel rule may indicate that satisfaction of the condition is to bias routing of a message from the network device to a terminal device that previously communicated with the network device. The method may also include determining a characteristic based on one or more messages in the series of messages, an input or account data; and determining whether the condition is satisfied based on the characteristic. When it is determined that the condition is satisfied, the method may include establishing a continuous channel between the network device and the terminal device. The continuous channel may facilitate routing a subsequent message from the network device to the terminal device. The subsequent message may correspond to the client. Further, the subsequent message may be received at a time separated along the time dimension from the times of the clustered series of messages. The method may also include generating a presentation indicating that the continuous channel has been established and including an identification associated with the terminal device. When it is determined that the condition is not satisfied, the method may include facilitating routing a subsequent message from the network device to a different terminal device. The subsequent message may correspond to the client. The subsequent message may be received at a time separated along the time dimension from the times of the clustered series of messages.

Embodiments of the present disclosure may also include a system. The system may include one or more processors, and a non-transitory computer-readable storage medium containing instructions which, when executed on the one or more data processors, cause the one or more data processors to perform operations including the method of conditionally establishing continuous channels for routing messages described above and herein.

Embodiments of the present disclosure may also include a computer-program product tangibly embodied in a non-transitory machine-readable storage medium, including instructions configured to cause a data processing apparatus to perform operations including the method of conditionally establishing continuous channels for routing messages described above and herein.

Additional embodiments of the present disclosure may also include a method for dynamically routing electronic messages to terminal devices. The method may include monitoring an exchange of a series of messages routed between a network device and a terminal device, and determining a characteristic of one or more messages of the series of messages. For example, the series of messages may correspond to a client. For example, the characteristic may correspond to a topic or sentiment. The method may include accessing a re-routing rule that includes a condition. The re-routing rule may indicate that satisfaction of the condition is to initiate a re-routing process. Further, the method may include determining whether the condition is satisfied based on the characteristic. When it is determined that the condition is satisfied, the method may include identifying a different terminal device, generating a dynamic message chronicle that includes at least some of the series of messages, transmitting the dynamic message chronicle to the different terminal device, receiving a new message from the network device, and transmitting the new message to each of the terminal device and the different terminal device. For example, the different terminal device may be associated with the client.

Embodiments of the present disclosure may also include a system. The system may include one or more processors, and a non-transitory computer-readable storage medium containing instructions which, when executed on the one or more data processors, cause the one or more data processors to perform operations including the computer-implemented method for dynamically routing electronic messages to terminal devices described above and herein.

Embodiments of the present disclosure may also include a computer-program product tangibly embodied in a non-transitory machine-readable storage medium, including instructions configured to cause a data processing apparatus to perform operations including the method for dynamically routing electronic messages to terminal devices described above and herein.

Additional embodiments of the present disclosure may include a computer-implemented method for indexing messages and generating message chronicles. The method may include detecting, at a computing device, an interaction between a network device and a terminal device; and identifying a determinable characteristic associated with at least part of the interaction. In some instances, the interaction can include one or more communications communicated between the network device and the terminal device. For example, the communication can include content data. The method may also include identifying an interaction topic based on the content data, identifying an issue-resolution stage based on the content data, and determining a parameter based on the content data. For example, the parameter can be indicative of a characteristic (e.g., a sentiment or intent) associated with the interaction. Further, the method may include setting a plurality of message indices and identifying an index of the plurality of message indices. For example, a message index can correspond to a series of communications between the network device and the terminal device. For example, the determined parameter or the content data can be used to identify the index. The method may also include selectively identifying one or more messages associated with the identified index, generating a message chronicle based on the identified one or more messages, and presenting or analyzing the generated message chronicle.

Embodiments of the present disclosure may also include a system. The system may include one or more processors, and a non-transitory computer-readable storage medium containing instructions which, when executed on the one or more data processors, cause the one or more data processors to perform operations including the computer-implemented method for indexing messages and generating message chronicles described above and herein.

Embodiments of the present disclosure may also include a computer-program product tangibly embodied in a non-transitory machine-readable storage medium, including instructions configured to cause a data processing apparatus to perform operations including the method for indexing messages and generating message chronicles described above and herein.

Additional embodiments of the present disclosure may include a computer-implemented method for facilitating message routing based on generated agent vectors. The method may include detecting, at a computing device, a message from a network device, and determining a topic associated with the message. For example, the message may include content data. Further, for example, determining the topic may include analyzing the content data. The method may also include determining a complexity level associated with the message, determining a parameter based on the message, and determining a non-substantive characteristic associated with the message. For example, the parameter can be indicative of a characteristic of the message (e.g., a sentiment or intent). A target object can represent an intent determined from the message transmitted by the network device. For example, a target object can represent an intent of the user operating the network device to seek assistance with password retrieval. Further, the method may include identifying a vector of corresponding variables for each agent in a set of agents, identifying a subset of the set of agents, and facilitating establishing an operating connection to route the message to a terminal device of agent in the subset. Identifying the subset can be based on agent vectors and the determined variables.

Embodiments of the present disclosure may also include a system. The system may include one or more processors, and a non-transitory computer-readable storage medium containing instructions which, when executed on the one or more data processors, cause the one or more data processors to perform operations including the computer-implemented method for facilitating message routing based on generated agent vectors described above and herein.

Embodiments of the present disclosure may also include a computer-program product tangibly embodied in a non-transitory machine-readable storage medium, including instructions configured to cause a data processing apparatus to perform operations including the method for facilitating message routing based on generated agent vectors described above and herein.

Additional embodiments of the present disclosure may include a method for displaying a user interface displayed on a computing device (e.g., a mobile device operated by a user). The user interface may be displayed during a real-time communication session or an asynchronous messaging session between a user operating a network device and an agent operating a terminal device. The method may include displaying a selectable representation for each of a plurality of clients. For example, a selectable representation may be associated with one or more continuous channels, such that a continuous channel corresponds to a communication session between a network device and a terminal device. The method may also include, displaying, upon selecting a selectable representation, one or more messages communicated between the network device and the terminal device. The method may also include displaying a plurality of representations of various communication exchanges related to different topics. For example, a representation may include a targeted message chronicle that relates to an identified topic. In some instances, selecting a representation of a topic can initiate an initiating or re-initiation of a continuous communication session with a terminal device (e.g., previously associated with the communication session or a different terminal device from the previous terminal device). The method may also include displaying an interface at a terminal device associated with an agent. The method may include displaying a representation of one or more communication sessions ongoing between users and agents. For example, the interface displayed at the terminal device may include indications of sentiments associated with the communication sessions. For example, a communication session may correspond to a negative polarity (e.g., a negative sentiment), and in this case, an indication may be displayed representing the negative polarity. In some instances, the interface displayed at the terminal device can represent the ongoing communication sessions, even while the network devices from which messages originate may be using different third-party applications for facilitating communication of messages.

Embodiments of the present disclosure may also include a system. The system may include one or more processors, and a non-transitory computer-readable storage medium containing instructions which, when executed on the one or more data processors, cause the one or more data processors to perform operations including the computer-implemented method for displaying a user interface displayed on a computing device described above and herein.

Embodiments of the present disclosure may also include a computer-program product tangibly embodied in a non-transitory machine-readable storage medium, including instructions configured to cause a data processing apparatus to perform operations including the method for displaying a user interface displayed on a computing device described above and herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1A:
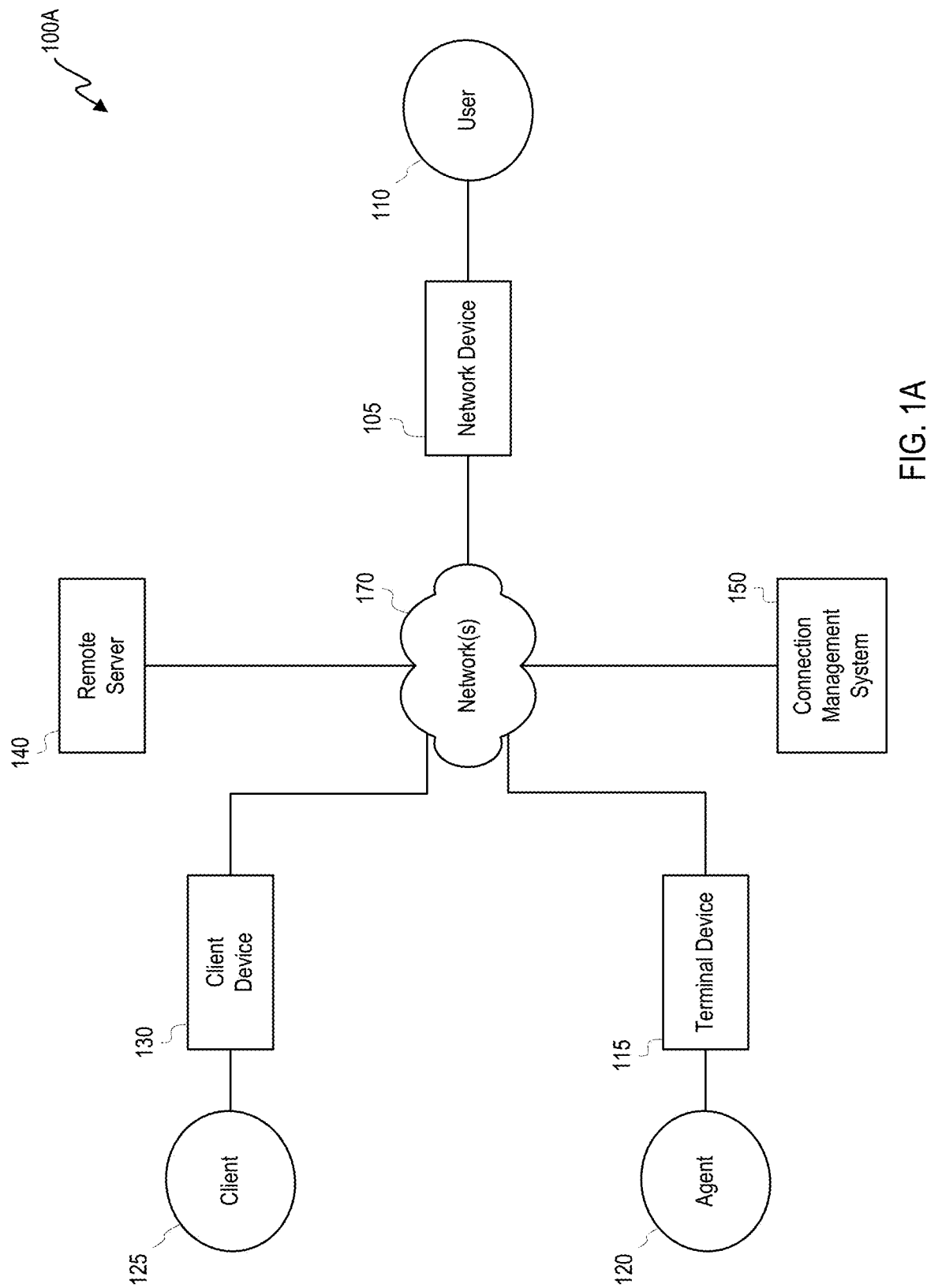
FIG. 1A shows a block diagram of an embodiment of a network interaction system.

FIG. 1A shows a block diagram of an embodiment of a network interaction system 100A which implements and supports certain embodiments and features described herein. Certain embodiments relate to establishing a communication link between a network device 105 (which can be operated by a user 110) and a terminal device 115 (which can be operated by an agent 120). For example, establishing a communication link can include establishing a channel over a network between the network device 105 and the terminal device 115. Communications (e.g., messages) transmitted from the network device 105 can be routed to the terminal device 115 over the established communication link, and vice versa.

In certain embodiments, a user 110 can be an individual browsing a web site or accessing an online service provided by a remote server 140. Further, in certain embodiments, the network interaction system 100A can include a client device 130 associated with a client 125. A client 125 can be an entity that provides, operates, or runs the web site or the online service, or individuals employed by or assigned by such an entity to perform the tasks available to a client 125 as described herein. The agent 120 can be an individual, such as an agent tasked with providing support or information to the user 110 regarding the website or online service (e.g., information about content on the web site). Out of a large number of agents, a subset of agents may be appropriate for providing support or information for (e.g., on behalf of or in association with) a particular client 125. The agent 120 may be affiliated or not affiliated with the client 125. Each agent can be associated with one or more clients 125. In some non-limiting examples, a user 110 can be an individual accessing a web page from a personal computing device, a client 125 can be a company that manages or administers the web page, and an agent 120 can be employed by the company to provide information relating to the web page to the user 110 and other visitors to the web page. In various embodiments, the user 110, client 125, and agent 120 can be other individuals or entities.

While FIG. 1A shows only a single network device 105, terminal device 115 and client device 130, a network interaction system 100A can include multiple or many (e.g., tens, hundreds or thousands, and so on) of each of one or more of these types of devices. Similarly, while FIG. 1A shows only a single user 110, agent 120 and client 125, an interaction system 100A can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic or intelligent routing of communications. A non-limiting example of facilitating strategic routing can include establishing a communication link between two devices (e.g., the network device 105 and the terminal device 115), and routing communications between the two devices. Facilitating strategic routing can also include re-routing communications to one or more additional devices. For example, connection management system 150 can facilitate routing by relaying a communication that originates from the network device 105 to the terminal device 115 or to another terminal device 115.

In some examples, a communication can include, for example, one or more messages with content (e.g., defined based on input from an entity, such as typed, clicked, spoken, or other suitable input), a request for or acknowledgment of device authentication (e.g., authentication of the network device 105 for purposes of establishing a communication link), or other suitable communications. In some examples, the communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. The present disclosure is not limited to the examples set forth herein.

In some instances, connection management system 150 can route the entire communication to another device (e.g., another terminal device or another network device). In some instances, connection management system 150 can modify the communication or generate a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

In some instances, part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification of a terminal device 115 can include evaluating one or more message parameters associated with a message transmitted from the network device 105, one or more conversation parameters associated with a series of messages (e.g., a conversation), one or more network device parameters associated with network device 105, one or more continuous communication parameters associated with client 125, a profile of each of a plurality of agents (or experts or delegates), or other suitable examples. Each agent (e.g., agent 120) in the plurality of agents can be associated with a terminal device (e.g., terminal device 115). The identification of the terminal device 115 can include a technique described, for example, in U.S. application Ser. No. 12/725, 799, filed on Mar. 17, 2010, which is hereby incorporated by reference in its entirety for all purposes.

In some instances, connection management system 150 can use one or more data structures to perform strategic routing between network device 105 and terminal device 115. For example, connection management system 150 can include a plurality of data structures. Examples of data structures include a queue, a buffer, an array structure, a tree structure, or other suitable data structure. For example, when connection management system 150 receives a communication from network device 105, the communication or a representation of the communication (e.g., an identifier) can be stored in a primary queue. Connection management system 150 can analyze each communication stored in the primary queue to identify a terminal device to which the communication should be routed. In some instances, a secondary queue may correspond to one or more terminal devices. For example, a secondary queue may store communications to be transmitted to or accessed by a particular terminal device 115 of the one or more terminal devices associated with the secondary queue. Upon identifying a terminal device 115 for communication with the network device 105, connection management system 150 can transmit the communication (which is stored in the primary queue) to be stored in the secondary queue associated with the identified terminal device 115. Secondary queues can be included in connection management system 150, a computing device associated with the terminal device, the identified terminal device itself, or another storage device.

In some instances, analyzing a communication stored in the primary queue to identify a terminal device can depend on one or more parameters (e.g., a message parameter, conversation parameter, network device parameter, continuous communication parameter). The one or more parameters can be determined using content included in (e.g., text, images, uploaded documents, and so on) or associated with (e.g., IP address, time between consecutive messages, time of receipt, and so on) the communication transmitted from the network device 105. For example, network device 105 can transmit a message including data representing a string of text to connection management system 150. Upon receiving the message, connection management system 150 can store the message in the primary queue and then analyze the message. An example of analyzing the message can include parsing the text included in the message, and determining whether the text (e.g., text data) corresponds to a polarity indication (e.g., positive polarity, negative polarity, neutral polarity, anger polarity, disgrace polarity, frustration polarity, and other suitable polarities). Connection management system 150 can generate a message parameter based on whether the text corresponds to, for example, the positive or negative polarity indication. An example of a message parameter can include a score or a numerical value generated as an output of an algorithm. Connection management system 150 can apply one or more stored rules to the generated message parameter to determine in which secondary queue the message should be stored. For example, a stored rule can indicate that messages associated with a message parameter below a threshold value (e.g., messages corresponding to a negative polarity indication) are to be initially routed to a particular secondary queue associated with a particular terminal device 115.

In some instances, analyzing the text of the message to determine the message parameter can include an analysis of textual or non-textual attributes associated with the message. For example, connection management system 150 can extract one or more lines of text included in the message. Connection management system 150 can identify whether the one or more lines of text include an anchor. Examples of an anchor include a string of text associated with a polarity (e.g., sentiment or intent, the word "frustrated" corresponding to a negative polarity or frustrated polarity, the word "happy" corresponding to a positive polarity, and so on). Anchors can be specific to a client 125. For example, anchors for a first client can be different for a second client. For example, a term "dispute" for one client can be negative, but can be neutral or positive for a second client. In some instances, anchors can be dynamically determined using supervised machine learning techniques. Further, one or more words near the identified anchor can be parsed for amplifiers. An example of an amplifier is a term that increases or decreases an intensity associated with the polarity of the anchor, such as "really," "not really," "kind of," and so on.

In some instances, connection management system 150 can tag the message as corresponding to a positive polarity indication when the text includes an anchor associated with a positive sentiment. Likewise, connection management system 150 can tag the message as corresponding to a negative polarity indication when the text includes an anchor associated with a negative sentiment. An example of tagging the message can include appending a code to the message that flags whether the message corresponds to the negative or positive polarity indication. When the message is tagged with the positive polarity indication, connection management system 150 can generate a first message parameter, which is associated with the positive polarity indication. When the message is tagged with the negative polarity indication, connection management system 150 can generate a second message parameter, which is associated with the negative polarity indication. In this example, the first message parameter and the second message parameter may be values that are different from each other.

In some instances, connection management system 150 can generate a conversation parameter based on a plurality of message parameters. For example, the conversation parameter can be used to determine a sentiment of an entire conversation during a communication session. In some examples, the conversation parameter can be dynamically updated in real-time as network device 105 transmits new messages that are routed to the identified terminal device 115. The conversation parameter can be evaluated for various purposes. Examples of purposes for evaluating the conversation parameter can include: determining a characteristic trend of a plurality of messages communicated between network device 105 and terminal device 115; determining whether to re-route messages transmitted from network device 105 to another terminal device (different from the initial terminal device 115 communicating with network device 105); determining whether to maintain routing of messages to the initial terminal device 115; reporting of one or more statuses associated with network device 105 or terminal device 115; evaluating a performance associated with terminal device 115; or triggering a notification alert to one or more additional terminal devices.

Figure 14:
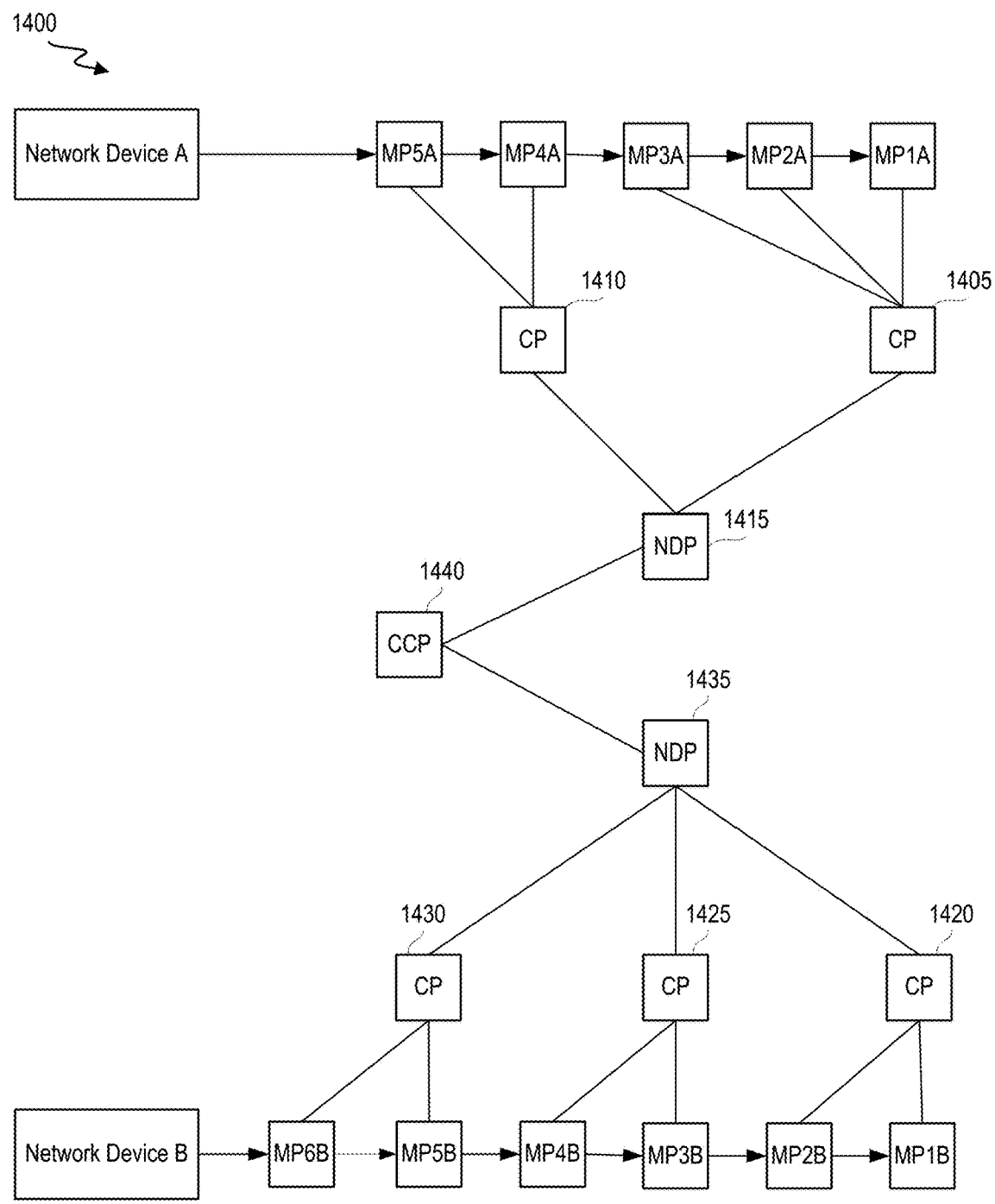
FIG. 14 is a flow diagram illustrating an embodiment of generating a continuous communication parameter.

In some instances, a network device parameter can be generated based on a plurality of conversation parameters (see FIG. 14 for further discussion). The network device parameter can be used to determine an overall sentiment of a particular network device. Further, a continuous communication parameter can be generated based on a plurality of network device parameters (see FIG. 14 for further discussion). The continuous communication parameter can be used to determine an overall sentiment associated with a particular entity (e.g., client 125).

In some instances, connection management system 150 can determine whether any connection channels are established between network device 105 and a terminal device associated with the client (or remote server 140) and, if so, whether such channel is to be used to exchange a series of communications including the communication. This determination may depend, at least in part, on a topic associated with the communication, a sentiment score (e.g., a message parameter) associated with the communication or a past related communication, a conversation parameter associated with a series of messages, a network device parameter associated with a network device, a continuous communication parameter associated with a client (e.g., client 125), a predicted (e.g., relative or absolute) response latency for terminal device 115 and/or a type of communication channel associated with the communication (e.g., instant message, message, email, phone). Selecting an established communication channel may promote consistency and reduce the need to relay information from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's knowledge base corresponds to a communication topic, an availability of an agent at a given time and/or over a channel type, a language match between a user and agent, and/or a personality analysis.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining and assessing one or more categories or tags of a current or past communication or communication series. For example, a communication can be assigned a category for each of (for example) a topic, channel type (e.g., email, SMS message, real-time chat, phone call or asynchronous message), language, complexity level, sentiment, and/or whether/which file type is attached, and a terminal-device selection can be biased towards terminal devices associated with similar, same or complementary knowledge bases, channel-type availability, language, skill level, sentiment, and/or file-type capabilities.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one example, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. Such storage can also facilitate generation of a message history or a chronicle of messages between a network device and first terminal device, which may be transmitted (for example) to a second terminal device when it is determined that the second terminal device is to join an existing or participate in a new communication series with the network device.

In some embodiments, connection management system 150 can monitor (e.g., analyze) the communication exchange in real-time and perform automated actions (e.g., rule-based actions) based on the live communications. An example of real-time monitoring of messages can include receiving a message and analyzing the message (e.g., applying one or more rules to the message) immediately and automatically after receipt of the message (e.g., with minimal delay, milliseconds, seconds, and so on). For example, when connection management system 150 determines that a communication relates to a particular product, connection management system 150 can automatically transmit an additional message to terminal device 115 containing additional information about the product (e.g., quantity of products in stock, links to support documents related to the product, or other information about the product or similar products).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

In one instance, connection management system 150 facilitates an initial match and routing between network device 105 and a first terminal device 115. For example, a message received in a communication from network device 105 can be routed to the first terminal device. As another example, communication management system 150 can transmit a communication to the first terminal device that includes or is indicative of a request or instruction to transmit a communication (e.g., initiating a communication series) to network device 105.

Connection management system 150 can monitor and/or analyze a corresponding communication series between network device 105 and the first terminal device to determine a characteristic (e.g., a trend). For example, connection management system 150 can analyze message content in one or more communications (e.g., to determine whether and/or how many of particular words, symbols or character types, such as "frustrat*", "very", "thank", or "irritat*", "!" or capital letters, were used). As another example, connection management system 150 can determine one or more statistics pertaining to each of one or more messages and/or the series. Examples of statistics can include, for example, message length (e.g., in words or characters), latency between a receipt of a communication and transmission of a responsive communication, latency between subsequent message transmissions, or typing speed while typing a message. As yet another example, connection management system 150 can receive and process one or more inputs, detected initially at network device 105 or the first terminal device and then identified to connection management system 150. Such inputs can identify, for example, a sentiment, a reroute request, or a resolution stage.

Connection management system 150 can evaluate the characteristic (e.g., characterizing message content, including a statistic or characterizing an input) to determine whether to bias subsequent routing in a particular manner. For example, a continuous-channel rule can include a condition relating to a characteristic that specifies when routing of network-device messages is to be biased towards the first terminal device (which previously participated in a communication exchange with the network device). The rule can be configured such that satisfaction of the condition results in establishment of a continuous channel between the network device and the first terminal device. The continuous channel can allow subsequent messages from the network device to be automatically routed to the first terminal device and/or preferentially routed to the first terminal device. The continuous channel can be configured to persist through multiple communication series. For example, even if a first series of messages are exchanged between the network device and first terminal device on a first day, the channel can bias routing of another message from the network device transmitted on a second day to be routed to the same first terminal device. A magnitude of such bias may depend on, for example, a time since a previous interaction between the network device and first terminal device (e.g., increasing the bias when a past interaction was recent), a total duration of and/or number of communications in a previous message exchange between the network device and first terminal device and/or a number of previous message exchanges between the network device and first terminal device (and/or a cumulative interaction time or count of exchanged messages).

Upon establishing a continuous channel, connection management system 150 can further facilitate presenting a presentation (e.g., notification) at network device 105 so as to alert user 110 that a continuous channel has been established, to identify the first terminal device or associated user and/or to indicate that subsequent messages (e.g., transmitted in association with an identifier of the channel, associated with a particular client, etc.) are to be routed to or to have routing biased towards the first terminal device.

In some instances, connection management system 150 may determine that the characteristic indicates that subsequent messages from network device 105 (e.g., pertaining to a client) are not to be routed to the same first terminal device and/or are to be rerouted. For example, it can be determined that the condition in the continuous-channel rule is not satisfied. Upon such a determination, connection management system 150 can identify a new terminal device to route communications (e.g., pertaining to a client) to from the network device.

In one instance, a continuous-channel rule is configured such that a continuous channel is to be established between a network device and a terminal device following an initial routing of a communication between the two devices. Thus, the continuous channel may serve to facilitate consistent message routing within a single message exchange. In an alternative or same instance, a continuous-channel rule may (also or alternatively) be configured such that a continuous channel is established, maintained or used so as to promote consistent message routing across different message series (e.g., the series being separated in time). Depending on the embodiment, a continuous-channel rule may limit a number of continuous channels that can be provided with respect to a given network device and/or client. For example, a rule may indicate that, for a given network device and client, the network device can only be connected to one (or three or another specified number) terminal devices via continuous channel.

In some instances, connection management system 150 can determine that a re-routing process is to be initiated (e.g., based on satisfaction of a condition in a re-routing rule). The determination can be based on a characteristic (e.g., characterizing message content, including a statistic or characterizing an input). For example, a re-routing rule can be configured such that re-routing is to be initiated upon detecting a characteristic indicative of user frustration or dissatisfaction; detecting a characteristic indicative of a lack of acceptable progress towards a resolution of an issue; detecting unacceptable terminal-device communication statistics (e.g., long response latencies); or detecting that messages are beginning to focus on a new topic.

A re-routing process can include identifying a different terminal device to participate in a communication exchange with network device 105. Such an identification can be based on, for example, a topic associated with the communication, a message parameter associated with the communication or a past related communication, a continuous communication parameter associated with network device 105, a predicted (e.g., relative or absolute) response latency for terminal device 115, a type of communication channel associated with the communication (e.g., instant message, message, email, phone), a language match, a type of each of one or more other terminal devices, a capability of one or more other terminal devices, and/or a match of an agent's skill with a network-device communication complexity. A selection of the different terminal device may be performed in a same, similar or different manner as compared to a selection of a first terminal device. For example, determining that a re-routing rule's condition has been satisfied may bias a subsequent terminal-device selection towards devices associated with more senior rankings, broader knowledge bases and/or better language capabilities.

A re-routing process may include transmitting a notification identifying a proposed re-routing to one or more devices, such as network device 105, the first terminal device or the different terminal device. The notification may include an option to accept and/or an option reject the proposed re-routing. The notification may include information about network device 105, the first terminal device and/or the different terminal device and/or an associated party.

To reduce an abrupt transition between terminal devices, connection management system 150 can coordinate an overlap time period. During this time period, each of the first terminal device and the different terminal device can receive one or more communications (or processed versions thereof) from network device 105. For example, a new communication from network device 105 can be duplicated and then routed to each of the first and different terminal device.

In some instances, connection management system 150 can generate a dynamic message chronicle that includes multiple messages from network device 105 and/or from the first terminal device. The chronicle can include, for example, all messages in a communication exchange, all messages routed within a defined time period (e.g., previous 3 minutes), or all messages associated with one or more defined tags or categories. For example, messages pertaining to a particular topic, sentiment (e.g., corresponding to dissatisfaction), or content type (e.g., including a question) can be selected. Connection management system 150 can transmit the dynamic message chronicle to the different terminal device. New messages from network device 105 and/or the first terminal device can further be transmitted to the different terminal device, such that the dynamic message chronicle can be appended with such new messages. Message selection for a dynamic message chronicle and/or whether a dynamic message chronicle is to be provided may also depend on whether re-routing is to occur during a temporally clustered series of messages or between message series.

In some instances, connection management system 150 can determine whether and/or when to stop routing communications to the first terminal device. For example, such routing termination may occur upon detecting a response communication from the different terminal device, after a defined time period has elapsed following transmission of the message chronicle, after detecting an input received at the first terminal device indicating an intent to exit a communication exchange, after detecting an input received at the different terminal device indicating an intent to handle a communication exchange, after detecting an input received at network device 105 requesting the proposed re-routing to the different terminal device be effected, and so on.

Depending on a rule or a reason for initiating a re-routing transfer, the re-routing may include closing a connection channel between network device 105 and the first terminal device (e.g., if a re-routing process was initiated in response to a low user sentiment) and/or establishing a new connection channel between network device 105 and the different terminal device.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

In some instances, connection management system 150 can authenticate a network device before establishing a communication link between the network device and a terminal device. For example, when a message is received at connection management system 150, connection management system 150 can identify which client 125 corresponds to information included in the received message. In some instances, a message can include an identification code identifying the client with which the message is associated. Connection management system 150 can then transmit a request to the network device for authentication information (e.g., login credentials, passwords, and so on). Upon receiving the authentication information, connection management system 150 can access client device 130 (e.g., a database storing user information) to verify the received authentication information corresponds to valid authentication information stored in client device 130. After the authentication information is verified, connection management system 150 can identify a set of terminal devices that correspond to client 125, and subsequently select a single terminal device from the set of terminal devices based on processes described herein.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1A is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 1B:
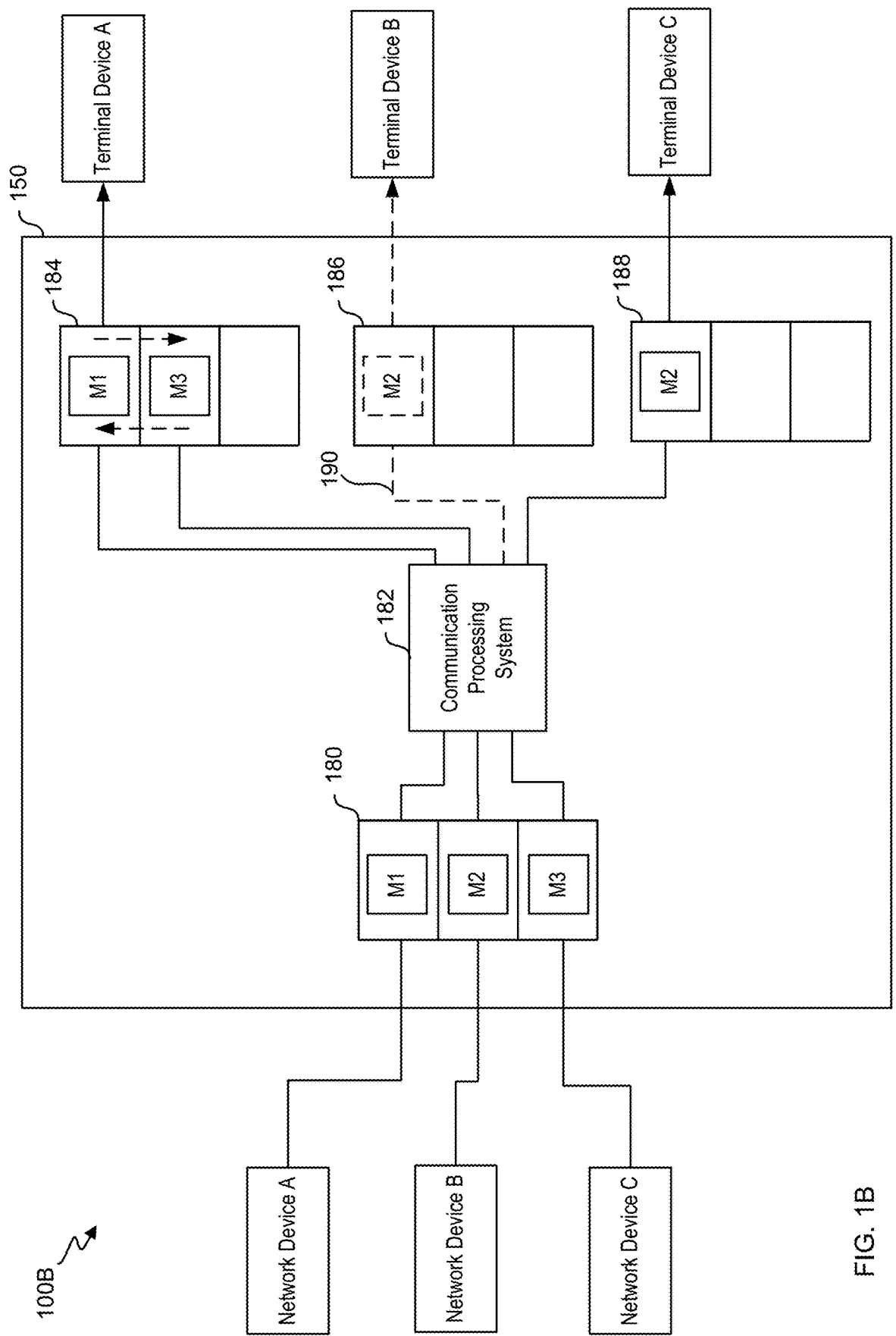
FIG. 1B shows a block diagram of another embodiment of a network interaction system.

FIG. 1B illustrates a block diagram of an embodiment of a network interaction system 100B, which includes network devices A-C, terminal devices A-C, and connection management system 150. Each of network devices A, B, and C can be structurally the same as network device 105 and operated by a user (e.g., user 110). Network devices A, B, and C can be collocated or distributed through different geographical areas. Each of terminal devices A, B, and C can be structurally the same as terminal device 115 and operated by an agent (e.g., agent 120). Terminal devices A, B, and C can be collocated or distributed through different geographical areas.

Connection management system 150 can intelligently determine the routing destination (e.g., terminal A, B, or C) of incoming communications (e.g., messages received from network devices A, B, and C). In some instances, connection management system 150 can include communication processing system 182 and a plurality of data structures. Examples of data structures include a queue, a buffer, an array structure, a tree structure, or other suitable data structure. In the example of network interaction system 100B, the plurality of data structures can include primary queue 180 and secondary queues 184, 186, and 188. Primary queue 180 can store all incoming messages received from various network devices (e.g., network devices A, B, and C).

In some instances, the received messages stored in primary queue 180 can be processed by communication processing system 182. For example, communication processing system 182 can retrieve a message from primary queue 180, process the message, and determine which secondary queue to store the message based on the processing. A secondary queue can correspond to a terminal device. For example, secondary queue 184 can be associated with terminal device A, secondary queue 186 can be associated with terminal device B, and secondary queue 188 can be associated with terminal device C. In this example, terminal device A can respond to messages stored in secondary queue 184, terminal device B can respond to messages stored in secondary queue 186, and terminal device C can respond to messages stored in secondary queue 188. Responding to messages stored in a secondary queue can include retrieving a message from the secondary queue, removing the message from the queue, and transmitting a communication (e.g., responding to content included in the message) to the network device that transmitted the message.

While FIG. 1B shows only a single primary queue 180 and three secondary queues 184, 186, and 188, network interaction system 100B can include any number of primary and secondary queues. In addition, while FIG. 1B shows the secondary queues are data structures included in connection management system 150, it will be appreciated that secondary queues can also be stored in terminal devices. For example, secondary queue 184 can be stored in terminal device A, secondary queue 186 can be stored in terminal device B, and secondary queue 188 can be stored in terminal device C.

Communication processing system 182 can process communications received from network devices A, B, and C. Communication processing system 182 can include one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other suitable electronic units designed to perform the functions described herein, and/or a combination thereof.

In some instances, processing communications received from network devices A, B, and C can include extracting content included in a received message, parsing through the extracted content, and applying one or more rules to the content. Communication processing system 182 can determine a destination (e.g., terminal A, B, or C) of the received messages based on a result of the applied one or more rules.

The one or more rules can be stored locally or remotely and accessed by communication processing system 182.

In some instances, a rule can be used to analyze text included in a received message. For example, the rule can be used determine whether one or more keywords are included in the text. As a non-limiting example, a message received from network device A can include the text "I do not know my password." The rule can parse through the text of the message to determine whether the word "password" is included in the text. In this example, the text of the message does include the word "password." Communication processing system 182 can identify a secondary queue associated with the rule when the rule successfully determines the existence of the word "password" in the text. For example, communication processing system 182 can query a lookup table to identify an address of a secondary queue associated with password retrieval (e.g., which is also associated with a terminal device corresponding to an agent who is trained to assist with password retrieval). In some instances, a rule can indicate whether a received message corresponds to a negative polarity, neutral polarity, or positive polarity. For example, a rule can parse through text included in a message to determine whether the phrase "can't" exists in the message. If the phrase "can't" exists in the message, the rule can indicate that the message has a negative polarity. As a non-limiting example, a message received from network device B can include the text "I can't access the Internet." The rule can identify the existence of the word "can't" in the message and determine that the message corresponds to a negative polarity because the user associated with network device B is experiencing an issue. In this example, communication processing system 182 can query a lookup table to identify an address of a secondary queue associated with managing such issues. Communication processing system 182 can transmit the message for storing in the identified secondary queue so that an agent trained to manage such issues can respond to network device B.

In other instances, the one or more rules can be automatically learned using machine learning techniques. For example, a neural network can be trained using supervised machine learning techniques based on content included in previous messages received at the communication processing system 710. One or more rules can be automatically generated based on results of the supervised machine learning.

In some instances, the one or more rules can be different for various clients 125. For example, a first set of rules can correspond to a first client and a second set of rules can correspond to a second client. As a further example, a rule can be associated with the first client and can indicate whether text included in a message corresponds to a negative polarity. The same rule can also be associated with the second client and can indicate whether text included in a message corresponds to positive or neutral polarity. For example, a rule can parse through text in a message to determine whether the word "dispute" exists in the message. For the first client, the existence of the word "dispute" in a message can indicate that the message corresponds to a negative polarity, whereas, for a second client, the existence of the word "dispute" in a message can indicate a neutral polarity.

Referring to network interaction system 100B, network device A can transmit a first message (hereinafter referred to as "M1"). Network device B can transmit a second message (hereinafter referred to as "M2"). Network device C can transmit a third message (hereinafter referred to as "M3"). Messages M1, M2, and M3 can be transmitted at the same time or at different times. Further, each of messages M1, M2, and M3 can be transmitted to connection management system 150.

Upon receiving messages M1, M2, and M3, connection management system 150 can store the messages in primary queue 180. In some instances, connection management system 150 can store messages M1, M2, and M3 in the order in which they are received. In the example of network interaction system 100B, M1 is received first and stored in the first position of primary queue 180, M2 is received second and stored in the second position of primary queue 180, and M3 is received last and stored in the third position of primary queue 180.

Communication processing system 182 can access primary queue 180 to retrieve the various stored messages. For example, communication processing system 182 can retrieve M1 from primary queue 180 for processing. As a non-limiting example, M1 can include the text "I am having technical issues." Communication processing system 182 can extract content included in M1. In some instances, communication processing system 182 can identify additional information included in or associated with M1 (e.g., an IP address from which M1 was transmitted, a time at which M1 was transmitted, a time span from the most recent message received from the network device associated with M1, and other suitable additional information). Communication processing system 182 can apply one or more rules to the content of M1 or the additional information associated with M1. For example, a rule can parse through the content of M1 to identify whether the phrase "technical issues" is included in the content. In this example, the applied rule would successfully identify the existence of the phrase "technical issues" in M1. Communication processing system 182 can query a lookup table for an address of a secondary queue associated with the rule. In this example, the response to the query of the lookup table can identify that secondary queue 184 is associated with the rule. For example, terminal device A, which may correspond to an agent trained in managing technical issues, may be associated with secondary queue 184. Communication processing system 182 can transmit and store M1 in secondary queue 184.

Communication processing system 182 can retrieve M2 from primary queue 180 for processing. As a non-limiting example, M2 can include the text "I forgot my password" and can be marked urgent by the user associated with network device B (e.g., the network device that transmitted M2). Communication processing system 182 can extract content included in M2 and apply one or more rules to the content of M2 or the additional information associated with M2. For example, a rule can parse through the content of M2 to identify whether the term "password" is included in the content. In this example, the applied rule would successfully identify the existence of the term "password" in M2. Communication processing system 182 can query a lookup table for an address of a secondary queue associated with the rule. In this example, the response to the query of the lookup table can identify that secondary queues 186 and 188 are associated with the rule. For example, terminal devices B and C may correspond to agents trained in managing password retrieval.

However, in this example, M2 was marked urgent. Marking a message as urgent can include tagging the message with a code or flag indicating that a quick response is required. Communication processing system 182 can identify the availability of terminal devices B and C to determine whether these terminal devices are available (e.g., currently accessible, available to respond, and so on) to respond quickly to M2. In this example, communication processing system 182 can identify that terminal device B is currently unavailable, but that terminal device C is available and can respond quickly. Accordingly, communication processing system 182 can transmit M2 for storage in secondary queue 188, which is associated with terminal device C. In this example, had terminal device B been available, communication processing system 182 may have transmitted (see dashed line 190 representing the potential connection link) M2 for storage in secondary queue 186.

Communication processing system 182 can retrieve M3 from primary queue 180 for processing. As a non-limiting example, M3 can also include the text "I have technical issues" (similar to M1) and can be transmitted from an IP address associated with a high priority (e.g., an important user). Communication processing system 182 can extract content included in M3 and apply one or more rules to the content of M3 or the additional information associated with M3. For example, a rule can parse through the content of M3 to identify whether the phrase "technical issues" is included in the content (e.g., the same rule applied to MI). In this example, the applied rule would successfully identify the existence of the phrase "technical issues" in M3. Communication processing system 182 can query a lookup table for an address of a secondary queue associated with the rule. In this example, the response to the query of the lookup table can identify that secondary queue 184 is associated with the rule. For example, terminal device A, which may correspond to an agent trained in managing technical issues, may be associated with secondary queue 184. Communication processing system 182 can transmit and store M3 in secondary queue 184.

However, in this example, M3 was transmitted from an IP address associated with a high priority. Further processing can be performed on secondary queue 184 to prioritize certain messages over others. For example, because M3 was transmitted from an IP address associated with a high priority, M3 can be moved to another position in secondary queue 184, such that M3 is retrieved by terminal device A earlier than M1 (as shown by the dashed arrow). Similarly, M1 can be moved to another position in secondary queue 184, such that M1 is retrieved by terminal device A after M3 is retrieved (as shown by the dashed arrow). While M1 was received first in time over M3 (e.g., M1 being stored in an initial queue position, which indicates that M1 would have been retrieved by terminal device A earlier than M3, and M3 being stored in a subsequent queue position), M3 was prioritized over M1 due to the high priority associated with M3 so that terminal device A will retrieve M3 earlier than M1 (e.g., the initial queue position now storing M3 is scheduled to be processed prior to the subsequent queue position now storing M1).

It will be appreciated that moving a message from the primary queue to a secondary queue can be used to improve load balancing of the primary queue. For example, during a peak time, if the primary queue receives a large number of messages from various network devices, moving messages to various secondary queues can improve the availability of queue positions in the primary queue. Accordingly, queue requests are less likely to be abandoned or stored in a buffer. Improved load balancing efficiently handles processing loads or burdens and effectively manages processing resources (e.g., a processor).

Figure 2:
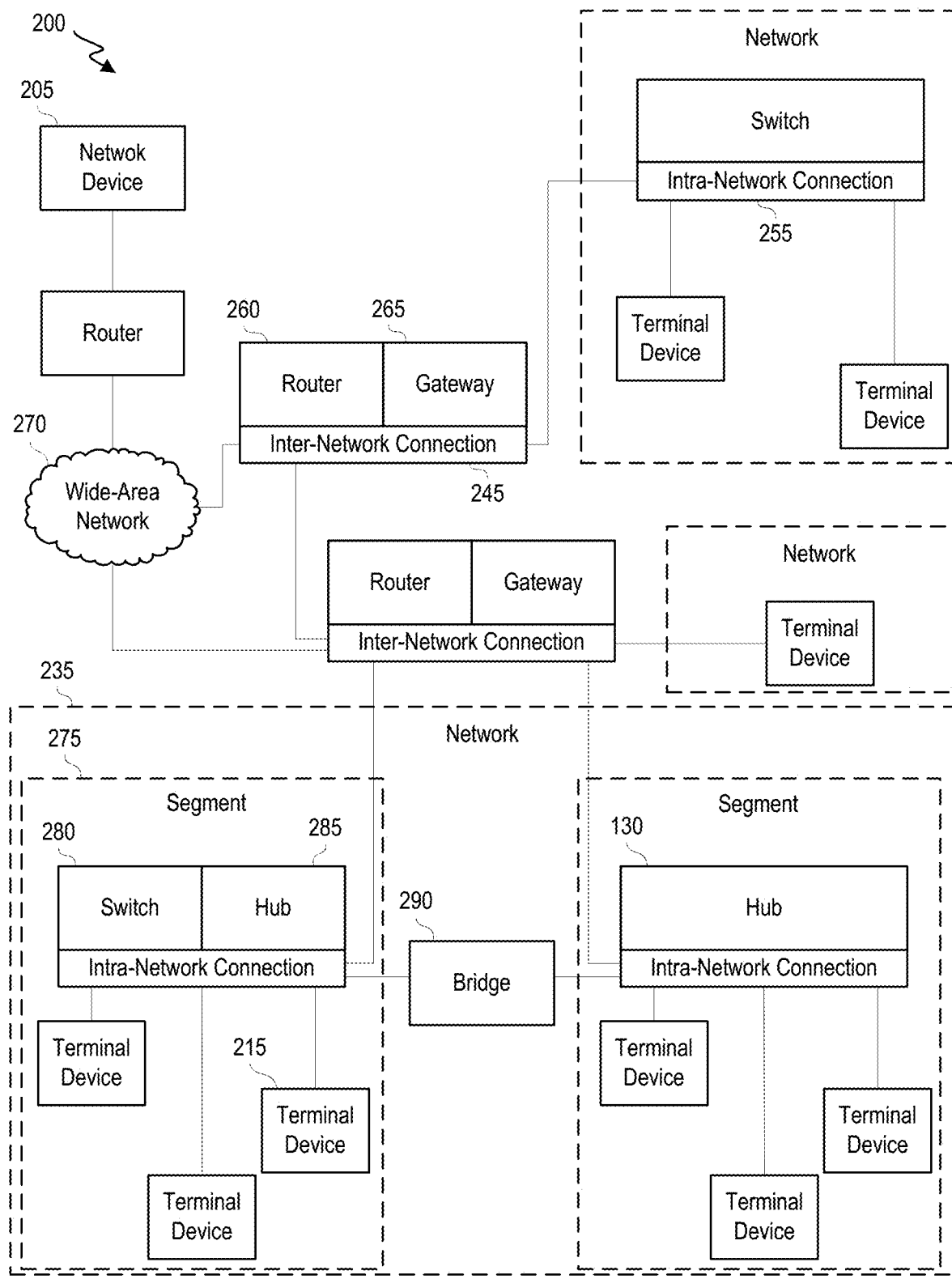
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
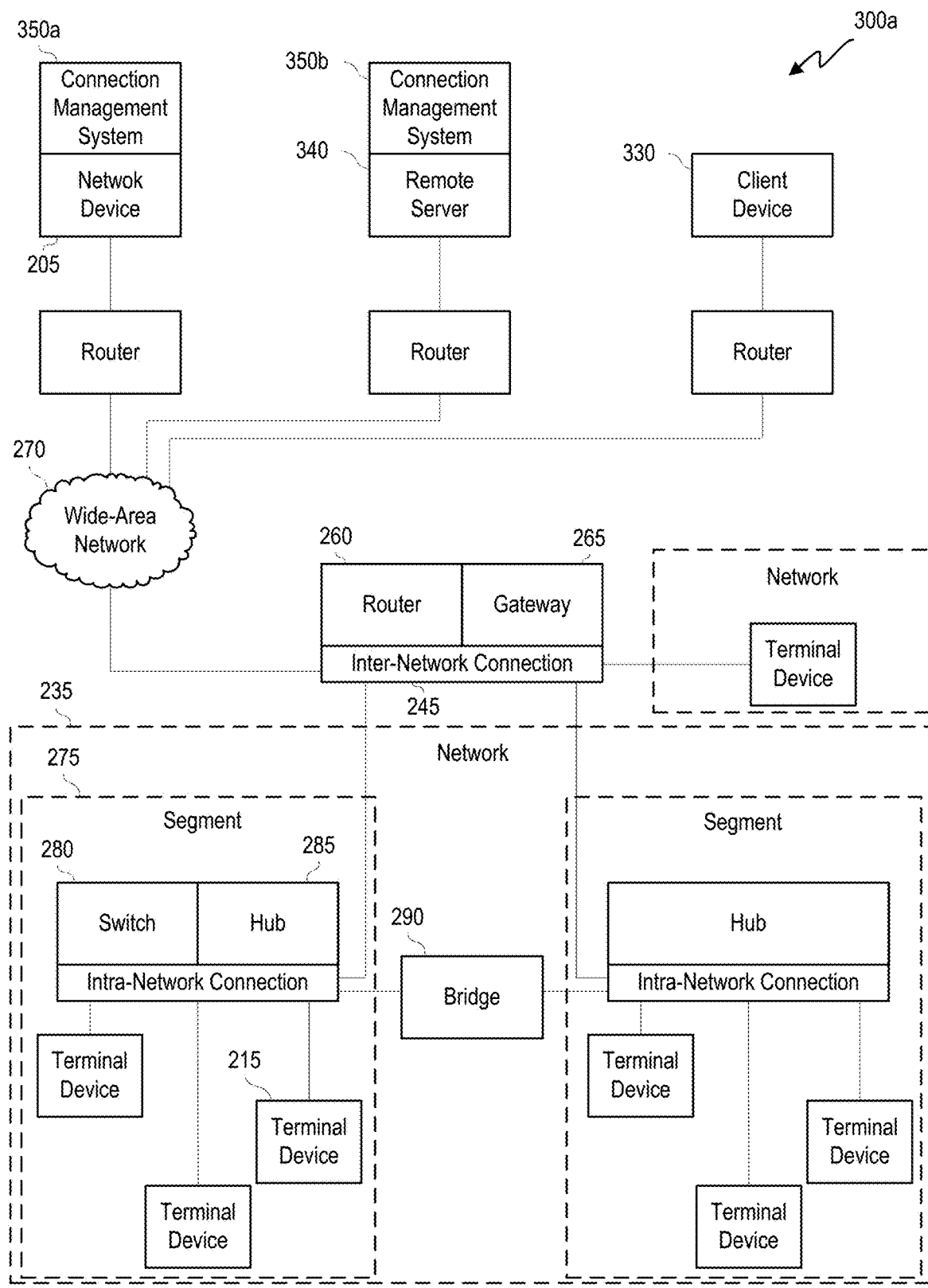
FIGS. 3A-3C show block diagrams of other embodiments of a network interaction system that includes a connection management system.
Figure 3B:
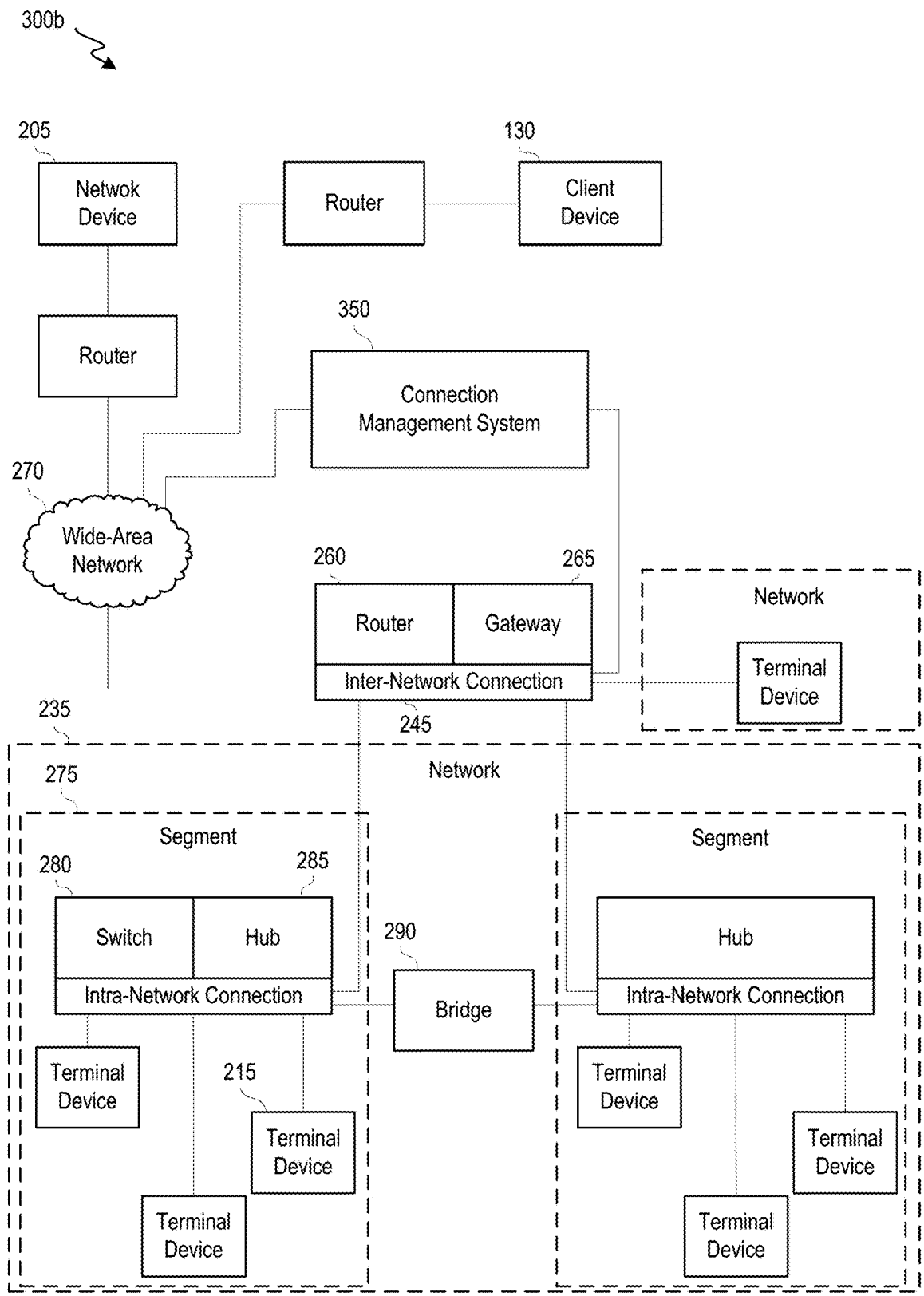
Figure 3C:
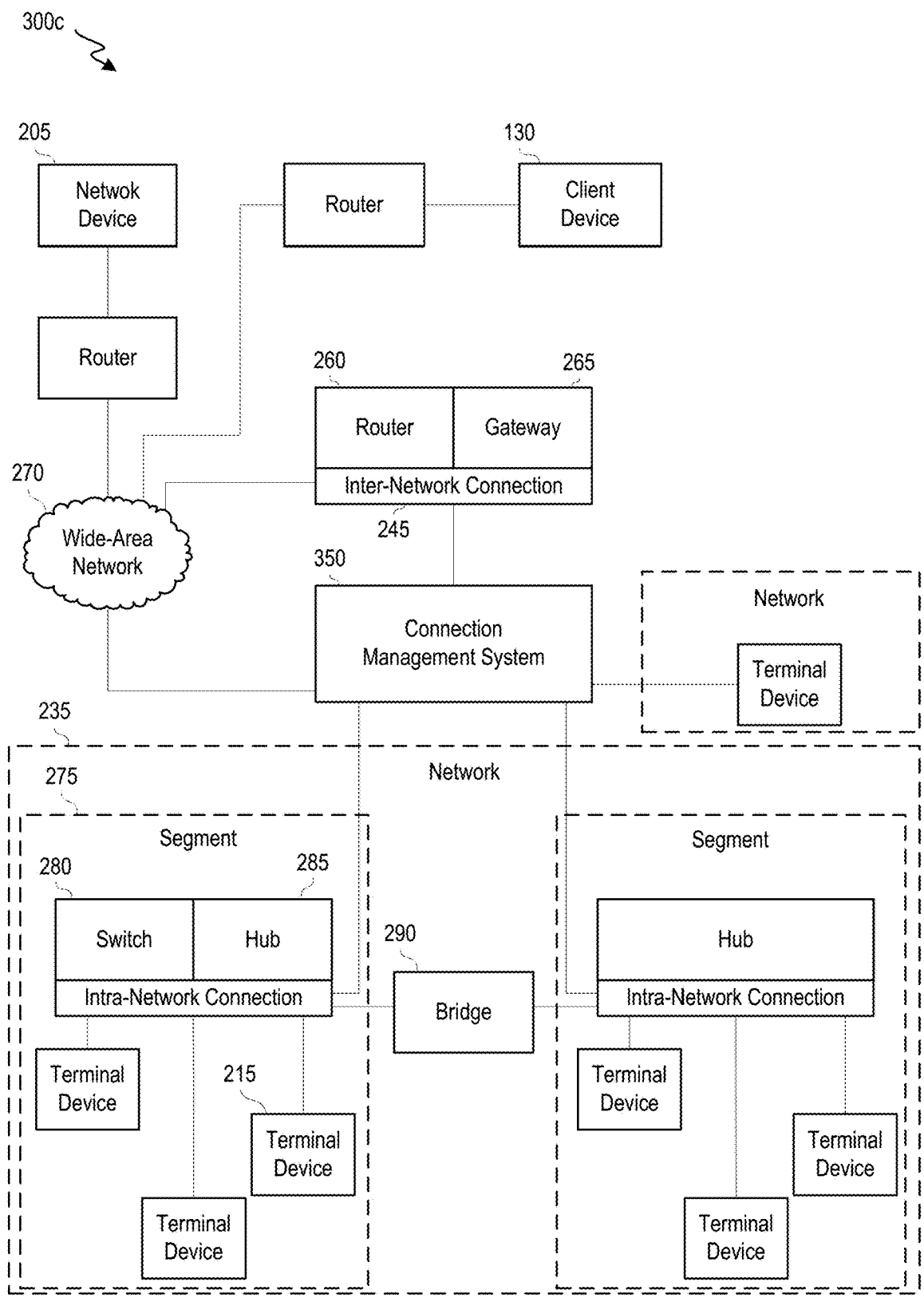

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing; channel establishment, management or closing; communication re-routing; communication categorization and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
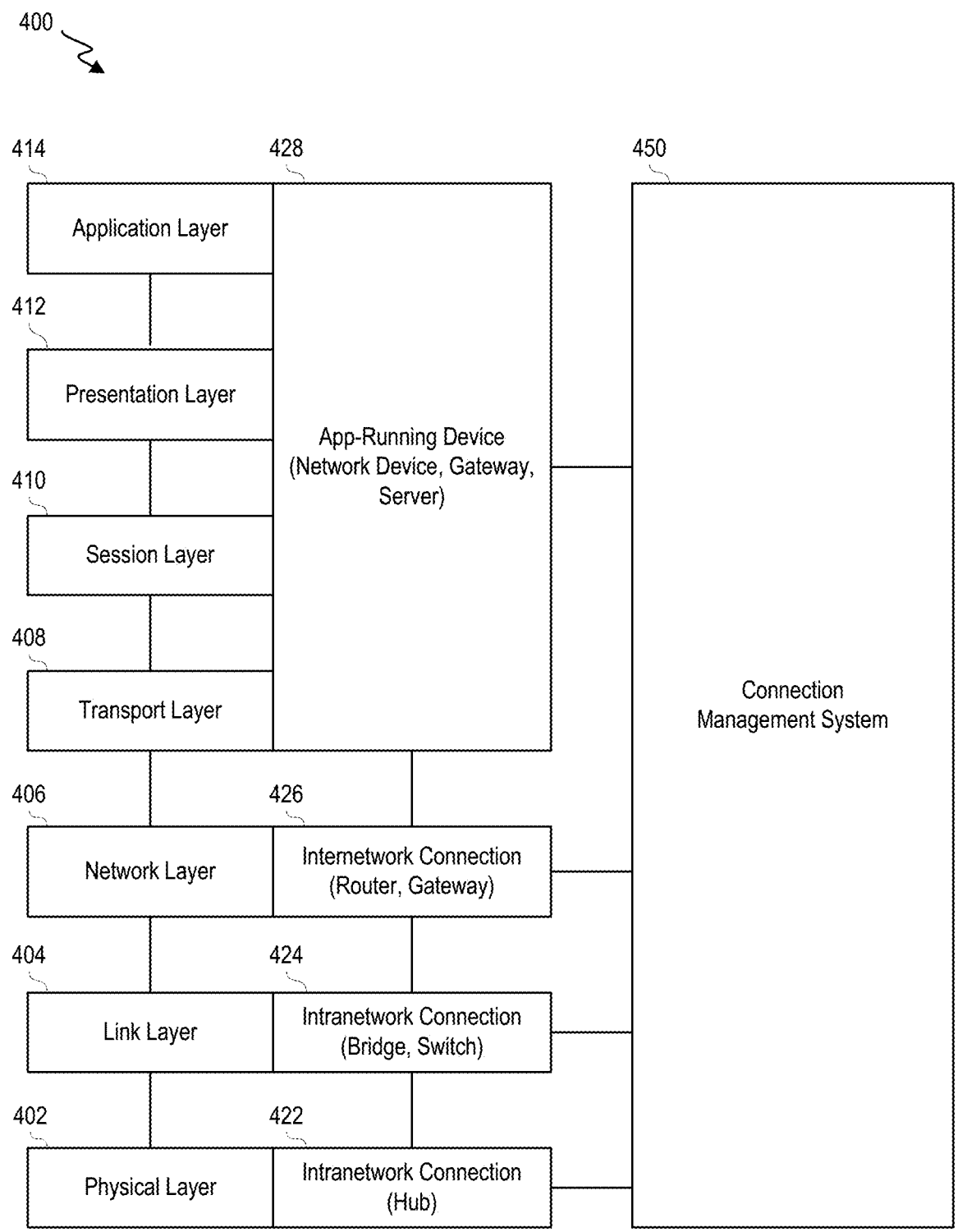
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
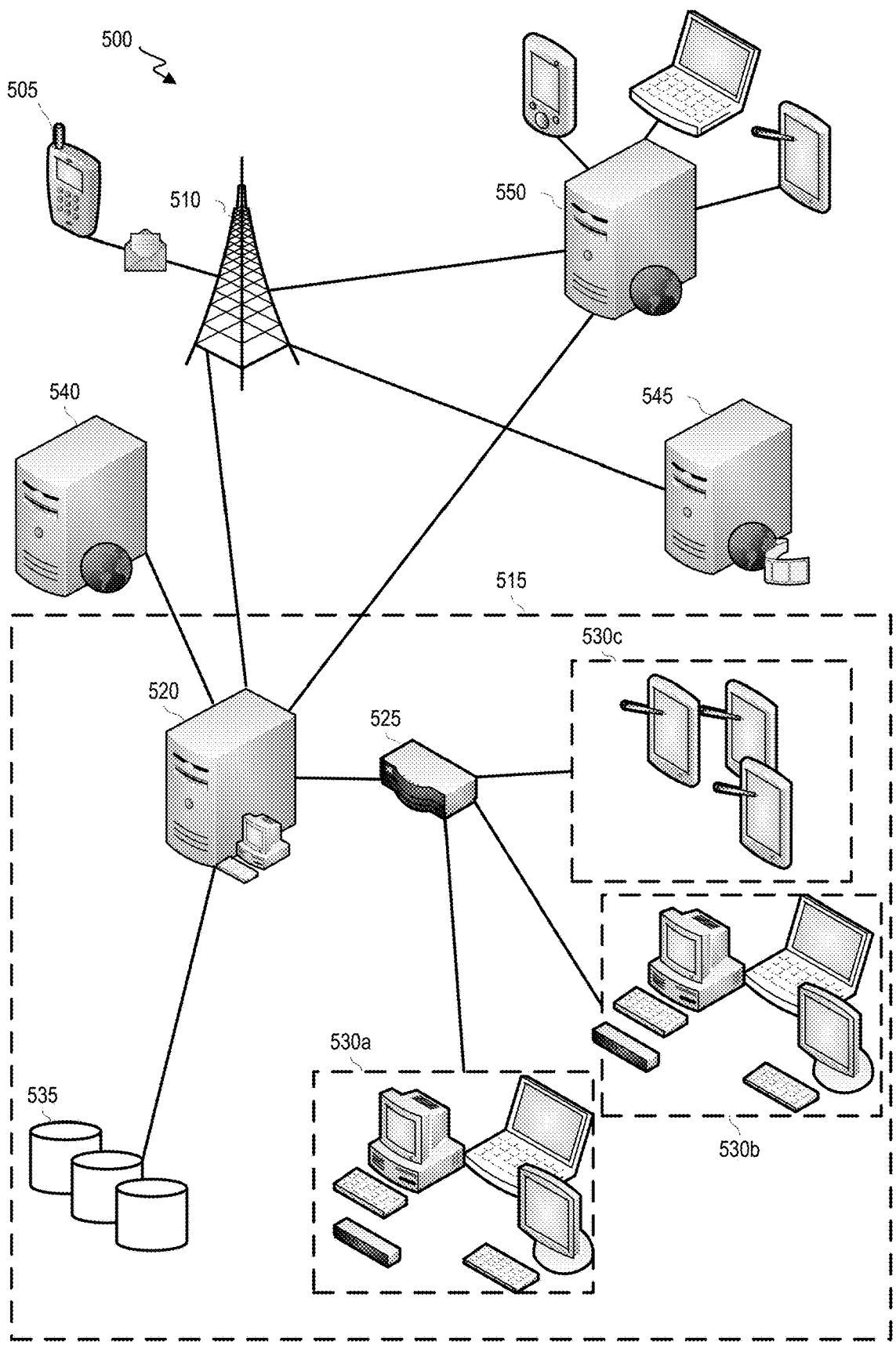
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530*a-c* can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
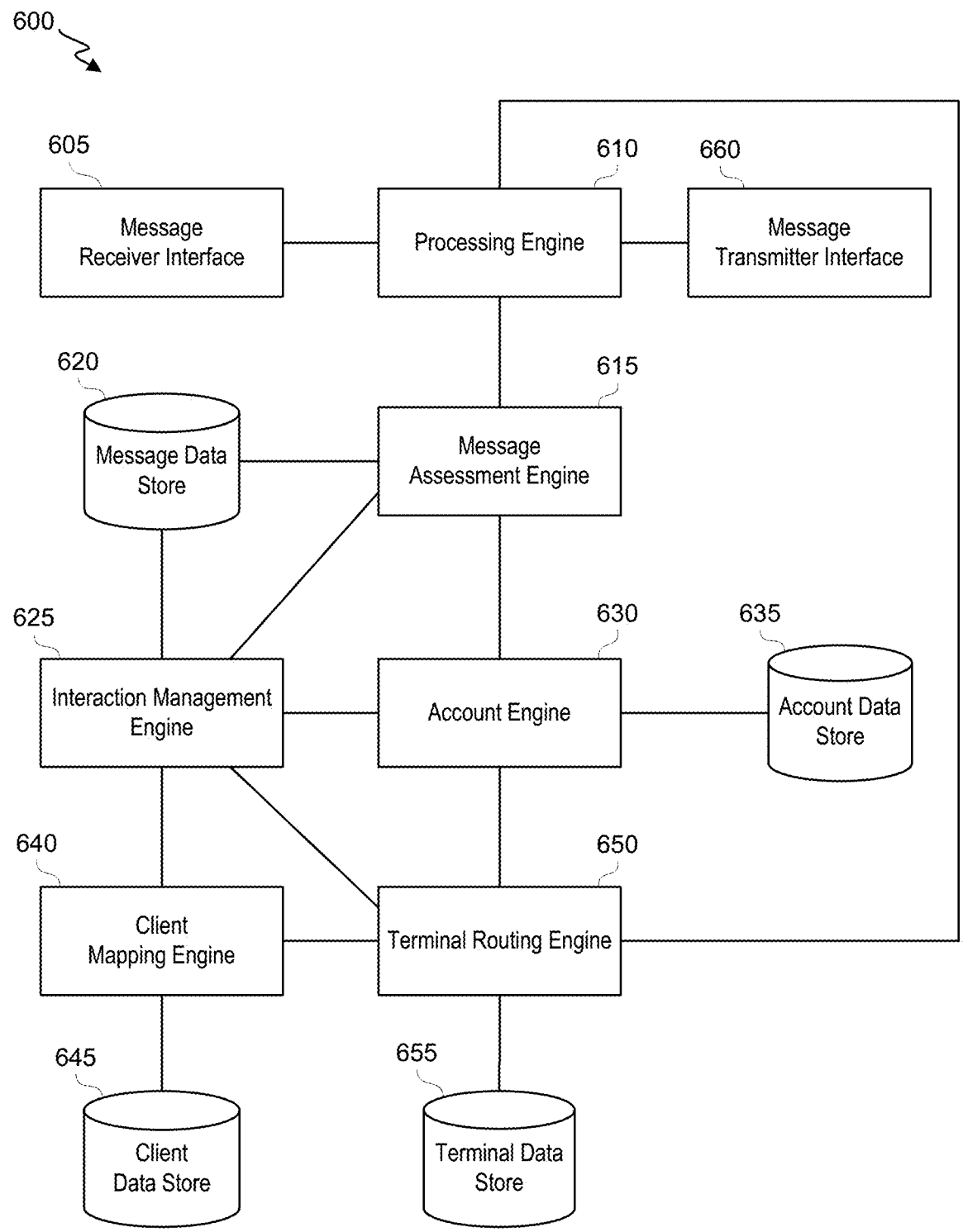
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). An app can refer to an application executed on a mobile device (e.g., a smartphone). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a product, a service, a technical issue, a use question, a complaint, a refund request or a purchase request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics. In some instances, message assessment engine 615 can generate a message parameter, a conversation parameter, a network device parameter, or a continuous communication parameter (see FIG. 14 for further discussion).

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Figure 7:
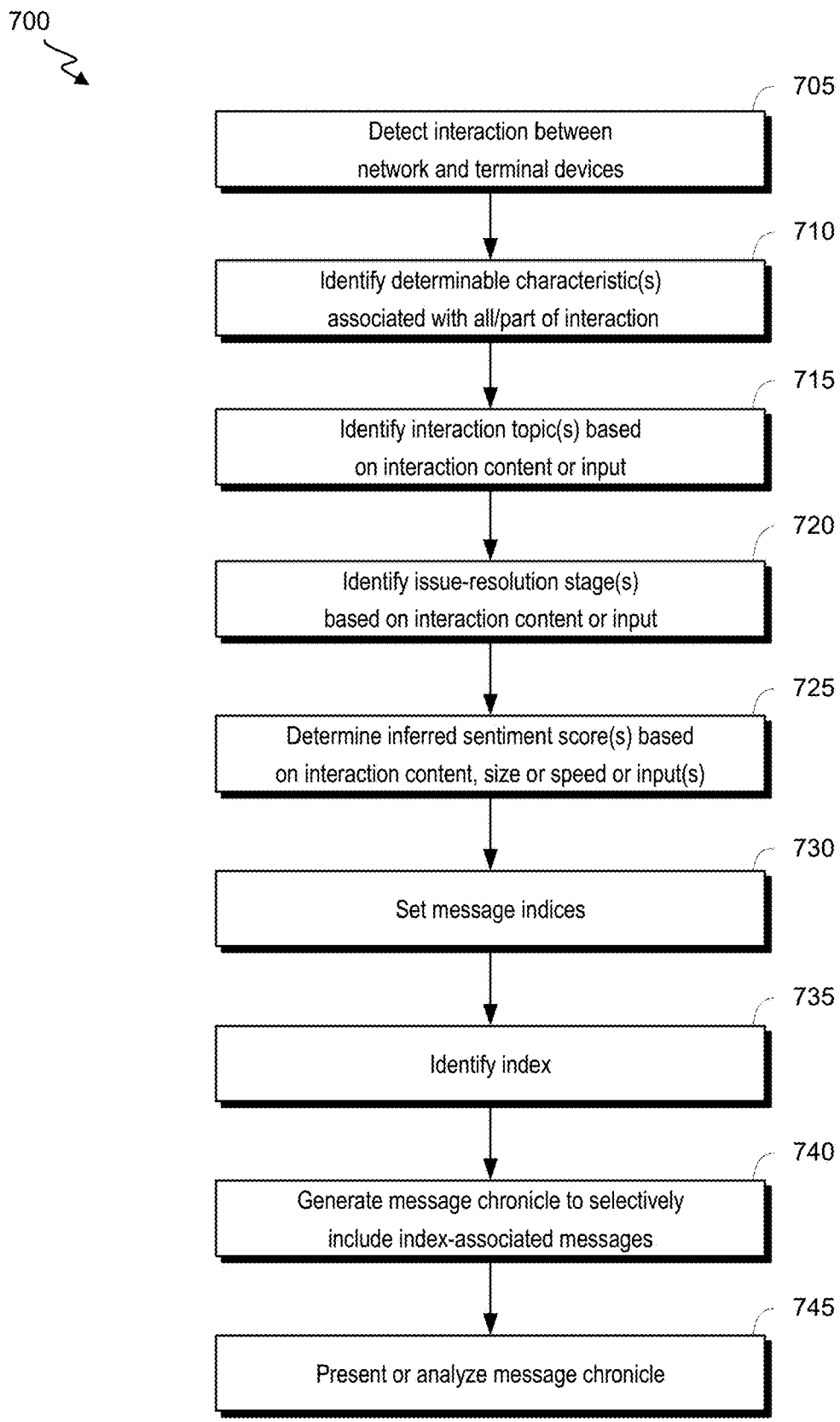
FIG. 7 illustrates a flowchart of an embodiment of a process for indexing messages and generating message chronicles.

FIG. 7 illustrates a flowchart of an embodiment of a process for indexing messages and generating message chronicles. Process 700 can be performed, for example, in part or in its entirety by a connection management system, such as connection management system 150, 350, 450, 520 or 600. Process 700 can begin at block 705 where a message receiver interface (e.g., message receiver interface 605 of FIG. 6) detects an interaction between a network device and a terminal device. The interaction can include one or more messages transmitted as part of one or more sessions (e.g., associated with different time periods, browser sessions, communication-initiation requests, etc.). The interaction can include, for example, an interaction facilitated by an app or webpage; an SMS interaction; an email interaction; a call interaction; and so on. Process 700 can be performed, for example, in part or in its entirety by a message assessment engine (e.g., message assessment engine 615 of FIG. 6).

At block 710, one or more determinable characteristics associated with all or part of the interaction are identified. A determinable characteristic can include, for example, an identifier of the network device, an identifier of the terminal device, an identifier of a user associated with the network device, an identifier of an agent associated with the terminal device, a size (e.g., number of words or characters) of a message; a number of messages (e.g. generally or from each of one or both devices); a time of a message; an inter-message delay (e.g., between messages from a same device or between messages from either device) and/or a count of particular characters (e.g., exclamation points or question marks).

At block 715, one or more topics of all or part of the interaction are identified based on content in one or more messages in the interaction and/or detected input. A topic can be identified based on extracting one or more keywords from a message's content, identifying message-associated data identifying a topic (e.g., identified based on a user or agent selection of the topic), and/or performing a semantic analysis (e.g., one based on an ontology, machine-learning, or a clustering technique). A topic can include a categorical topic (e.g., one selected from a list of available topics) or a tag topic (e.g., allowing for a topic identification to be open-ended).

At block 720, one or more issue-resolution stages are identified based on content in one or more messages in the interaction and/or detected input. Issue resolution can be inferred based on keyword or phrase detection (e.g., detecting various common interaction-closing phrases, such as "Did I answer all of your question?" "Thank you for your help", "I will try that", etc.). Issue resolution can also or alternatively be detected based on input received at a network device or terminal device (e.g., and communicated to a connection management system). The input can correspond to a selection of a resolution stage or issue-handling stage (e.g., "Resolved"; "Investigating") or an input terminating a session in a manner indicative of a resolution stage (e.g., after positive closing message content).

At block 725, one or more inferred sentiment scores are determined based on one or more messages in the interaction, a size of one or more messages, a speed of constructing one or more messages, an inter-message latency and/or detected input. For example, a set of sentiments may be defined, with each being associated with one or more indicators (e.g., keywords, statistics or input identifiers). A semantic, statistical, clustering logical or other analysis can then be performed to classify the message so as to be associated with one or more of the set of sentiments. For example, a sentiment definition may indicate that high message frequency from a given device (e.g., relative to that of the other device) and/or long messages may be indicative of a "Frustrated" sentiment. As another example, a sentiment definition may indicate that particular keywords (e.g., "thank", "frustrated", "not working", "annoyed") may correspond to particular sentiments. Block 725 can include generating a single sentiment score or multiple sentiment scores (e.g., one for each of the terminal device and network device; one for each of a set of sentiments; and/or one for each time period or message).

At block 730, one or more message indices are set. The one or more message indices may be set so as to reflect the results of one or more of blocks 710-725. In some instances, an index is set in a hierarchical manner. For example, a series or collection of messages may be associated with a given index, in which case the index may (but need not) pertain to each message in the series or selection. In some instances, one or more indices are assigned to each of some or all messages in the interaction. Setting a message index can include associating a particular message with an indicator reflecting a determined or identified value or other data. Thus, for example, setting an index can include defining or generating metadata, an association structure, etc.

At block 735, an index is identified. In some instances, the index can be one identified in input (e.g., entered at a network device or terminal device). For example, a user may indicate an interest in being presented with a set of messages pertaining to a particular topic. In some instances, the index can be identified in accordance with a rule. For example, a rule may indicate that, subsequent to determining that a re-routing process is to be initiated, messages associated with poor sentiment scores are to be aggregated. In various instances, block 735 can include identify a single index (e.g., a particular topic), a set of indices (e.g., multiple topics, a particular topic and a particular network device) and/or a range of indices (e.g., a sentiment-score index below a threshold).

At block 740, a message chronicle is generated to selectively include a plurality of messages, each message in the plurality of messages being associated with the index. Generating the message chronicle can include, for example, retrieving a set of messages (e.g., those associated with the identified index or indices) from a message data store (e.g., message data store 620 from FIG. 5) and aggregating the messages. The messages may be ordered based on one or more indices or dimensions, such as time, sentiment, resolution stage, source device, and/or topic. In some instances, a sorting technique can be determined based on input and/or can be set based on the identified index or indices.

At block 745, the message chronicle is analyzed or a presentation of the message chronicle is facilitated. For example, a message chronicle that includes messages sharing a first index can be analyzed to characterize a presence and/or magnitude of a trend in a second dimension (e.g., sentiment or resolution stage). Facilitating a presentation of the message chronicle can include transmitting the message chronicle to another device or locally presenting the chronicle. It will be appreciated that presenting the chronicle may include presenting at least part of the chronicle (e.g., so as to fit within a display on a device).

In some instances, the message chronicle can be dynamic. For example, even after a message chronicle is generated, transmitted and/or presented, newly received messages associated with the identified index or indices may be added to the chronicle. Such message addition may be accomplished by, for example, transmitting the new messages along with an indication that they are to be added to the chronicle, updating a stored version of the chronicle with the new message and transmitting or presenting the updated version, or generating a new version of the chronicle (e.g., at regular time periods or upon detecting any new message associated with a particular channel, network device and/or terminal device).

Figure 8:
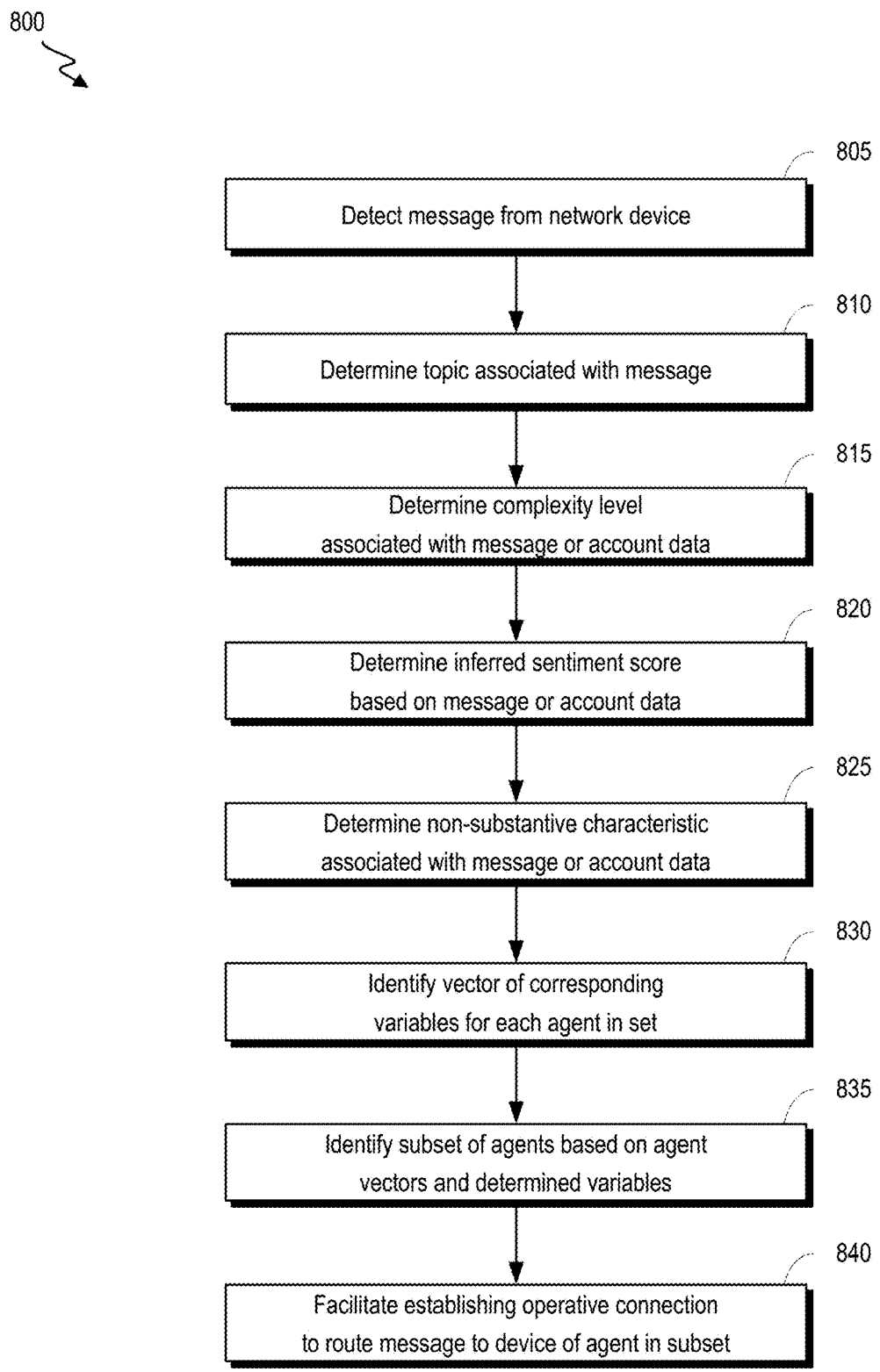
FIG. 8 illustrates a flowchart of an embodiment of a process for facilitating message routing based on generated agent vectors.

FIG. 8 illustrates a flowchart of an embodiment of a process 800 for facilitating message routing based on generated agent vectors. Process 800 can be performed, for example, in part or in its entirety by a connection management system, such as connection management system 150, 350, 450, 520 or 600. Process 800 can begin at block 805 where a message receiver interface (e.g., message receiver interface 605 of FIG. 6) detects a message from a network device.

At block 810, a topic associated with the message is determined, such as by a message assessment engine (e.g., message assessment engine 615 of FIG. 6). The topic can be determined based on, for example, content in the message and/or detected input. A topic can be identified based on extracting one or more keywords from a message's content, identifying message-associated data identifying a topic (e.g., identified based on a user or agent selection of the topic), and/or performing a semantic analysis (e.g., one based on an ontology, machine-learning or clustering technique). A topic can include a categorical topic (e.g., one selected from a list of available topics) or a tag topic (e.g., allowing for a topic identification to be open-ended).

At block 815, a complexity level associated with the message or account data associated with the network device is determined, such as by an interaction management engine (e.g., interaction management engine 625 of FIG. 6). For example, a complexity level may be determined based on a prevalence of technical terms (e.g., matching those in a defined list) in the message, a length of the message, a number of question marks or requests in the message and/or an identifier of a complex product or service. As another example, an interaction management engine can communicate with an account engine (e.g., account engine 630 of FIG. 6) so as to access account data from an account data store (e.g., account data store 635 of FIG. 6). The account data may reflect a (e.g., predicted) level of complexity associated with the user based on a previous communication exchange, input from an agent, webpages or app pages visited and/or profile data (e.g., education completed or occupation). This account data may be used to predict a level of complexity that a message exchange will involve. It may be assumed (for example) that a user having visited many highly technical webpages and/or having advanced degrees may request more complex questions to another user.

At block 820, an inferred sentiment score is determined, such as by an interaction management engine, based on the message or account data associated with the network device. For example, an interaction management engine can receive an inferred sentiment score from a message assessment engine generated based on the message or associated data (e.g., metadata and/or other data in a message-inclusive communication). Such a score may have been based on (for example) a size of the message, a speed of constructing the message, and/or a word or character in the message. A semantic, statistical, clustering logical or other analysis can then be performed to classify the message so as to be associated with one or more of the set of sentiments, such as an analysis detailed herein (e.g., in relation to block 735 of process 700 of FIG. 7). Examples of techniques that can be used to assess sentiment or generate a sentiment score (for any purpose disclosed herein) can include, for example, keyword matching, lexical affinity, and machine learning (e.g., support vector machines, information theory, latent semantic analysis, semantic networks, ontologies, and/or neural networks).

As another example, an account engine may retrieve account data corresponding to the network device indicative of sentiment tendencies. To illustrate, account data may indicate that an associated user frequently provides intra- or post-communications input identifying dissatisfaction (or, conversely, satisfaction) with communication exchanges, that agents frequently provide input indicating that a user seemed frustrated (or, conversely, cooperative and appreciative), that semantic analysis frequently identified degradation (or, conversely, improvement) in sentiment scores throughout an exchange, and so on. An inferred sentiment score can include, for example, a numeric or categorical score.

At block 825, a non-substantive characteristic is determined, such as by an interaction management engine, that is associated with the message or account data associated with the network device. The non-substantive characteristic, for example, a size (e.g., number of words or characters) of a message; a speed at which the message was typed (e.g., as identified via metadata in a communication), a time of a message; an inter-message delay (e.g., between a start or end of a most recent message series between the network device and a terminal device associated with a same client as one related to the message) and/or a count of particular characters (e.g., exclamation points or question marks).

At block 830, a vector of corresponding variables is identified, such as by a terminal routing engine (e.g., terminal routing engine 650 of FIG. 6), for each agent in a set of agents. The corresponding variables can include or can be based on data in a terminal data store (e.g., terminal data store 655 of FIG. 6). Examples of corresponding variables can include an identification of a topic that an agent has been assigned to handle or has been trained on; a level of experience (e.g., time at a company or a client-assigned experience level); a level of an agent's company-associated position; an indication as to how a network-device-associated sentiment is typically changed (e.g., generally or when beginning at a particular sentiment point) during a message exchange with a terminal device of the agent; and/or a current or typical (e.g., average or median) sentiment score associated with the agent or terminal device. The vector may further include one or more additional variables, such as an indication as to whether the agent and/or an associated terminal device is available to respond to the message and/or an indication as to via which communication types the agent is able to receive and/or send.

The vector can include any combination of data including multiple of the corresponding variables. The vector can include a single data structure or part or all of multiple data structures.

At block 835 a subset of the set of agents is identified, such as by an interaction management engine, based on the agent vectors and determined variables. The subset can include a single agent or multiple agents and can include fewer agents then in the set of agents. In some instances, a number of agents to be included in the subset can be fixed (e.g., generally and/or defined for a particular client). In other instances, the number may be variable (e.g., depending on the identified vectors).

In one instance, a score is generated for each agent based on a corresponding vector. For example, the score may include a weighted sum of the vector's elements, where the weights may be pre-defined (e.g., generally or for a particular client) or determined based on one or more of the variables determined in blocks 810-825. The subset can then include one or more agents associated with a score above a relative or absolute threshold (e.g., an agent with the highest score amongst the set of agents). Additionally or alternatively, a filtering strategy can be employed. For example, each of one or more agents associated with a particular complementary variable (or one beyond a prescribed threshold), such as a variable indicating that the agent is not currently available, may be excluded from the subset. Additionally or alternatively, identifying the subset can include using a load-balancing or pseudorandom-selection technique. For example, a single agent can be selected from amongst multiple agents associated with above-threshold scores generated based on the corresponding vectors.

At block 840, an interaction management engine can facilitate establishing an operative connection to route the message to a terminal device associated with an agent in the subset. The operative connection may, in some instances, include a continuous connection that can persist across message series or one specific to a particular message series. Establishing a connection can include storing a routing indication indicating that messages received from the network device (e.g., at least during a given session or until the operative connection is closed) are to be routed to the terminal device.

In one instance, a single agent can be identified (e.g., at block 835), and a connection can be established. A communication may be sent to the network device that identifies the agent (e.g., before or with a transmission of a responsive communication routed from the terminal device). In one instance, information pertaining to multiple (e.g., all) agents in the subset are transmitted to the network device, such that a user can select an agent to communicate with. The information can include, for example, a name, picture, expertise indication, position and/or languages spoken. Upon receiving a selection indication, an interaction management engine can establish an operative connection between the network device and a terminal device associated with the selected agent.

It will be appreciated that block 840 can include facilitating establishing a direct operative connection between the terminal device and the network device (e.g., by transmitting an address or phone number of the network device to the terminal device, by transmitting an address or number of the terminal device to the network device or by receiving or selecting an address or number of the terminal device at the network device) or an indirect operative connection (e.g., by generating a routing protocol at an intermediate device).

Figure 9:
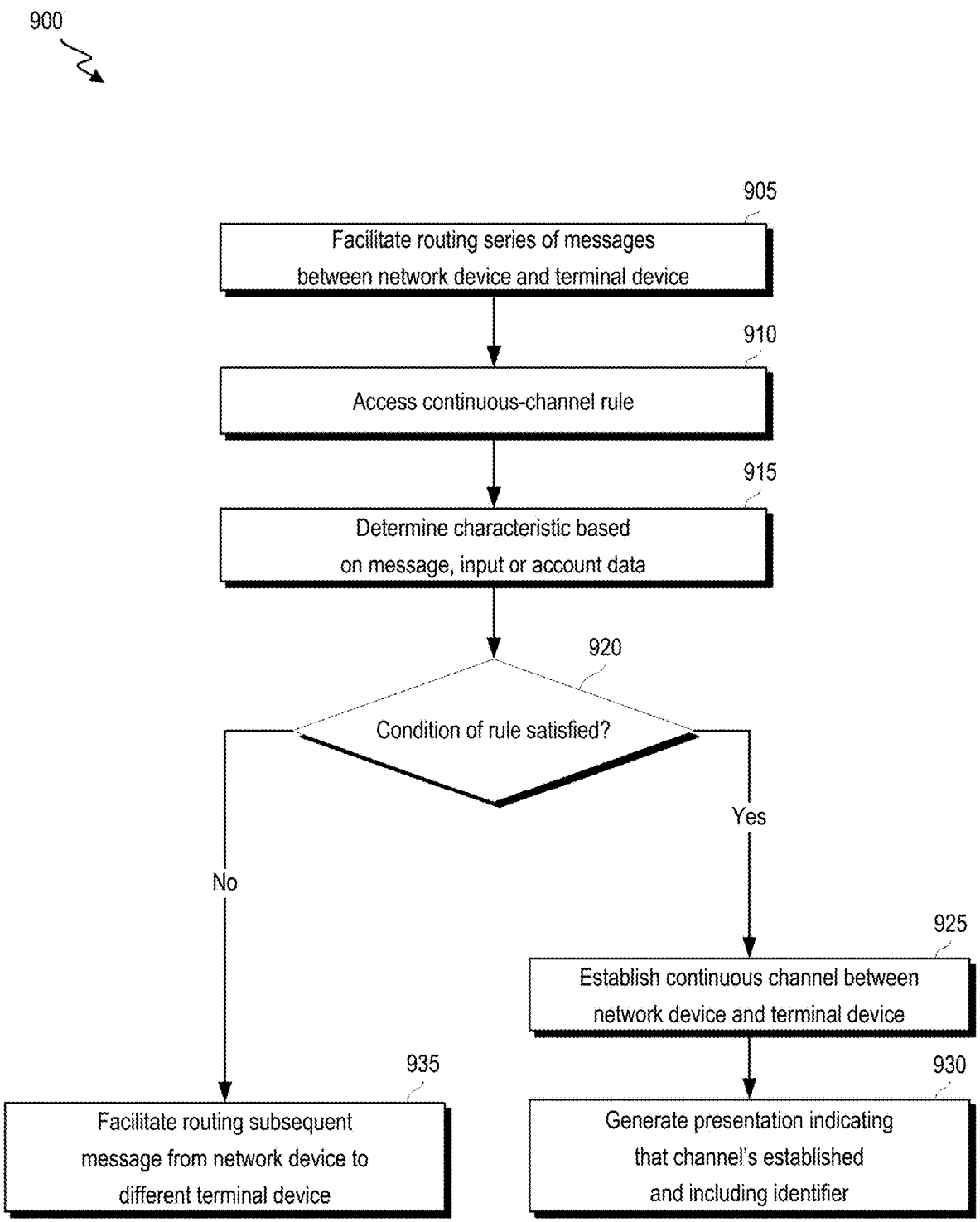
FIG. 9 illustrates a flowchart of an embodiment of a process for managing establishment of a continuous channel.

FIG. 9 illustrates a flowchart of an embodiment of a process 900 for managing establishment of a continuous channel. Process 900 can be performed, for example, in part or in its entirety by a connection management system, such as connection management system 150, 350, 450, 520 or 600. Process 900 can begin at block 905 where an interaction management engine (e.g., interaction management engine 625 of FIG. 6) facilitates routing a series of messages between a network device and a terminal device.

For example, such facilitation can include controlling destination data in an initial or relayed message (e.g., depending on whether a connection management system is operating, at least in part at a network device, at a network device). As another example, the facilitation can include establishing a routing protocol, such that communications received from the network device are routed to the terminal device and vice-versa. As yet another example, the facilitation can include sending destination data pertaining to the network device to the terminal device and/or sending destination data pertaining to the terminal device to the network device, such that the devices can directly communicate (via one or more networks and connection components).

The series of messages can include messages transmitted as part of a session and/or being associated with transmission times that are similar (e.g., within an hour of each other). The series of messages can include messages received and/or transmitted via a single session of a webpage or website (e.g., indicating that a user did not close a browser during the session).

At block 910, a continuous-channel rule is accessed, such as by an interaction management engine. A continuous-channel rule can include a condition that, when satisfied indicates that a continuous channel is to be established between the network device and terminal device. The condition may relate to a characteristic pertaining to one or more messages, one or more inputs (e.g., from a user and/or agent) and/or account data. Generally, the condition may be structured so as to be satisfied when it can be predicted that long-term communications between an agent associated with a terminal device and a user associated with a network device will be constructive at leading to efficient and complete resolution of any user issues, will promote client objectives (e.g., user satisfaction, purchase, or repeated web access), and/or will promote a positive user sentiment.

The condition can include one defined by the client, generally defined and/or learned. For example, a learning algorithm may be established to generate or modify the condition based on which established continuous channels were terminated by a user action (or agent action), a frequency of use of one or more continuous channels, and/or monitoring of a user sentiment, web access, purchasing decisions, etc. during use of the continuous channel or in between or after uses.

The condition may relate to a characteristic related to a message, input or account data. The condition may include, for example, one or more thresholds to which a characteristic can be compared and/or one or more values to which a characteristic can be compared. For example, a condition may indicate that it is satisfied when a user sentiment score is above 80% at an end of a message series and when user account data indicates that the user has not closed more than the larger of three or 80% of established of continuous channels.

In some instances, the condition may relate to any one of a message parameter, conversation parameter, network device parameter, and a continuous communication parameter (see FIG. 14 for further discussion). For example, if a conversation parameter indicates that a series of messages (e.g., a conversation about a topic) communicated between a network device and a terminal device has a positive polarity, the condition of the continuous channel rule may be satisfied.

At block 915, a characteristic is determined, such as by the interaction management engine, based on one or more messages in the series of messages, an input, or account data. For example, a characteristic can include a polarity (e.g., negative, neutral, positive, and so on) indicating a sentiment of one or more messages, a sentiment score derived based on a single or multiple messages, a change in sentiment scores during a series of messages, an issue-resolution stage corresponding to a message or series of messages, and/or a change in an issue-resolution stage during a series of messages. As another example, a characteristic can include an indication as to whether an input was received at the network device or terminal device requesting establishment of a continuous channel with the other device. As yet another example, a characteristic can be based on a degree of match between account data corresponding to a user indicating times at which the user typically transmits messages and account data corresponding to an agent indicating times of typical availability. As yet another example, a characteristics can reflect a frequency or count of use of one, more, or all continuous channels established to include the network device (e.g., pertaining to a particular client or any such channel) and/or a percentage or count of termination of one, more, or all continuous channels established to include the network device (e.g., pertaining to a particular client or any such channel).

At block 920, a determination is made, such as by the interaction management engine, as to whether a condition of the rule is satisfied based on the characteristic. The determination may include, for example, comparing each of one or more characteristic values to a corresponding threshold and/or determining whether a characteristic matches a particular value (e.g., a categorical or numeric value).

When it is determined that the condition is satisfied, process 900 can continue to block 925, where a continuous channel is established, such as by the interaction management engine, between the network device and terminal device. Establishing the continuous channel can include transmitting one or more instruction communications and/or storing data to promote the ability of the network device to communicate with the same terminal device during a subsequent message series.

For example, when a connection management system is separate from the network device, the interaction management engine can transmit data about the terminal device, agent, and/or continuous-channel instruction to the network device. When the connection management system is operating, at least in part, on the network device, the interaction management engine may receive or have already received data about the terminal device or agent. Using the terminal device and/or agent data, the network device may then address some or all subsequent client-associated communications to the terminal device. To illustrate, in one instance, any message from the user generated in part via a particular (e.g., client-associated) website may be addressed to the terminal device. As another illustration, an app may identify the agent or allow the user to request a new agent, and all messages generated in correspondence with a selection of the agent may be addressed to the terminal device.

As another example, destination data in communications transmitted from the network device need not be influenced by the continuous-channel establishment. Instead, a destination device receiving such a communication may implement a protocol to bias routing, to conditionally route, or to always route client-associated communications from the network device to the terminal device. Thus, establishing the continuous channel can include generating or updating a routing protocol that pertains to the network device (e.g., and a client associated with the terminal device).

Establishing the continuous channel may, but need not (depending on the embodiment), result in all messages associated with the client being routed to the terminal device. For example, such routing may require that a user have first provided input selecting the channel or have generated the message in a context associated with the channel. As another example, the channel may have particular applicability, such as applicability for a given topic or issue. Thus, messages may be routed to the terminal device selectively upon determining that a message relates to the topic or issue.

At block 930, a presentation is generated, such as by the interaction management engine, indicating that a channel has been established and including an identifier. The identifier may identify an agent associated with the terminal device. The identifier may include, for example, a picture, name, expertise identifier, and/or position of the agent. The presentation may include an option that a user can select so as to direct a particular message to the agent. The presentation may also include one or more other options, such as one to terminate the continuous channel and/or to send a non-directed message that will not have routing biased towards the terminal device. The presentation may be dynamic and may reflect, for example, a current real-time availability status of the agent.

When it is determined that the condition is not satisfied, process 900 can continue to block 935 where routing a subsequent message from the network device to a different terminal device can be facilitated, such as by the interaction management engine. The different terminal device can be selected, for example, using part or all of process 800, based on availability, to be biased towards a terminal device associated with more agent experience, a different agent skill and/or a different agent position.

In some instances, before performing block 935, a notification is transmitted to a network device indicating that a subsequent message can be or will be routed to a different terminal device. The notification may, but need not, include information about the different terminal device and/or associated agent. The notification may be accompanied with an option to select corresponding to a request to proceed with the proposed re-routing and/or with an instruction not to proceed with the proposed re-routing. Block 935 may then, in some instances, be conditionally performed (e.g., only upon receiving a request to proceed with the re-routing or so long as an instruction not to proceed with the re-routing has not been received).

Part or all of process 900 may be performed, in various embodiments, during or after a session between the network device and terminal device. Thus, for example, in one instance, block 935 may correspond to re-routing messages in a session, such that a terminal device that the network device is communicating with at an end of a session may be different than a terminal device that the network device communicated with at a beginning of a session.

Figure 10:
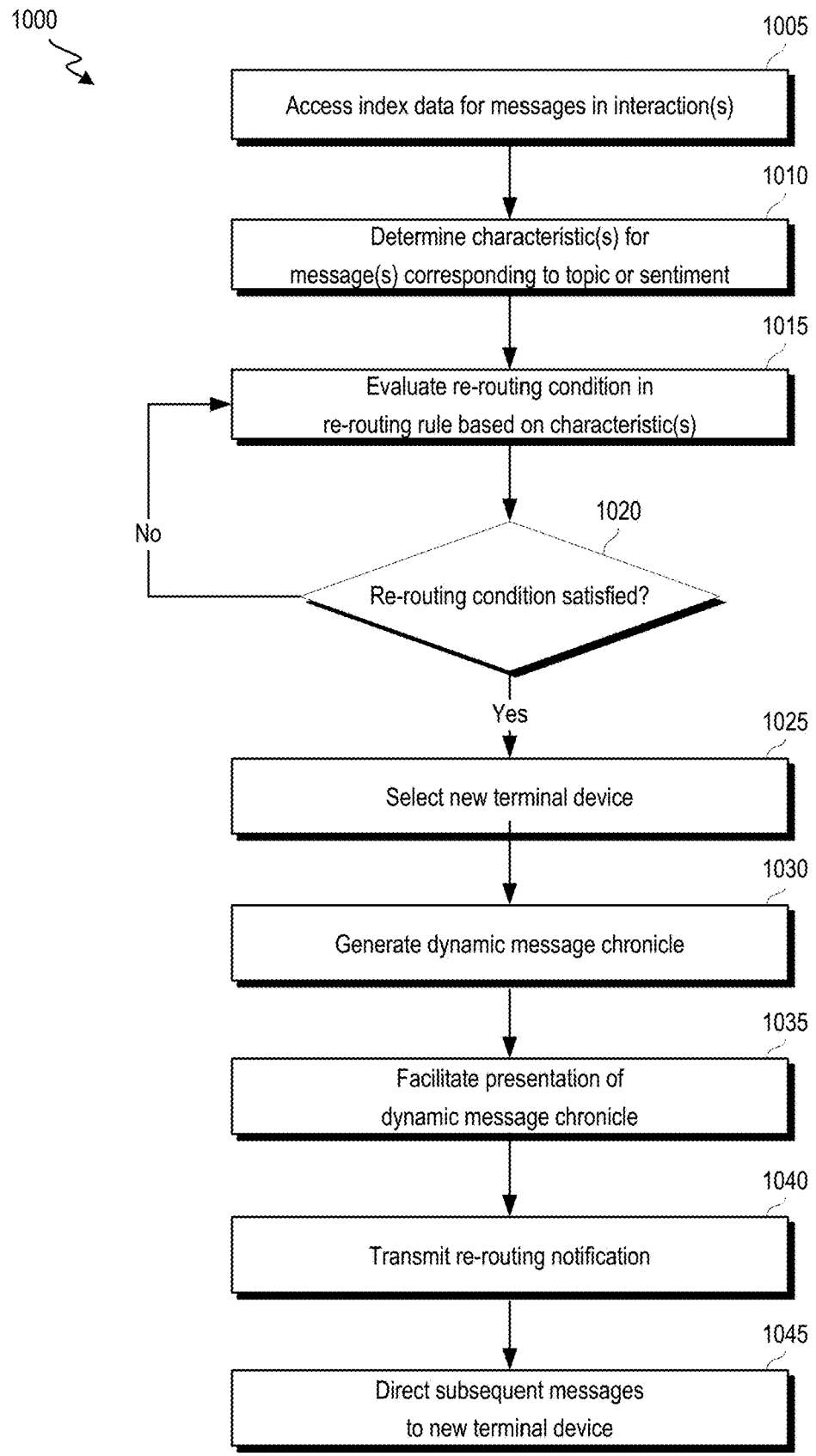
FIG. 10 illustrates a flowchart of an embodiment of a process for dynamically routing electronic messages to terminal devices based on indices.

FIG. 10 illustrates a flowchart of an embodiment of a process 1000 for dynamically routing electronic messages to terminal devices based on indices. Process 1000 can be performed, for example, in part or in its entirety by a connection management system, such as connection management system 150, 350, 450, 520 or 600. Process 1000 can begin at block 1005 where a message assessment engine (e.g., message assessment engine 615 of FIG. 6) accesses index data for one or more messages in one or more interactions. The indices can include one or more indices set in accordance with block 730 of process 700 of FIG. 7.

At block 1010, one or more characteristics for the one or more messages can be determined, such as by the message assessment engine. The characteristic(s) can correspond to a topic, sentiment, or polarity associated with one or more messages. The one or more messages can include one or more messages in a communication series between a network device and terminal device. The terminal device can include a terminal device associated with a client. The one or more messages can include one or more messages transmitted by the network device, the terminal device, or both.

The one or more characteristics can be determined based on, for example, content in the message(s), data associated with the message(s) (e.g., included in one or more message-inclusive communications), and/or one or more inputs received at the network device and/or terminal device. For example, a terminal device, upon receiving a message from a network device, may prompt an agent to select one or more topics and/or sentiments for the message from a list of potential topics and/or sentiments. As another example, a user may be prompted to identify a message topic before a communication is transmitted, and the selection may be identified within the communication including the message. As another example, a message-analysis technique disclosed herein may be used to automatically (e.g., without human aid) detect a topic and/or sentiment. In some instances, the one or more characteristics can be based on any of a message parameter, conversation parameter, network device parameter, or continuous communication parameter (see FIG. 14 for a further discussion).

In some instances, the characteristic(s) relate to a static characterization, such as a topic or sentiment at a particular time or pertaining to a particular message. In some instances, the characteristic(s) relate to a differential characterization, such as whether, an extent to which, and/or how a topic or sentiment has changed during a message series. In some instances, the characteristic(s) relate to a higher-level characterization, such as a range of topics or sentiments associated with different portions of a message series. In some instances, a sentiment-corresponding characteristic includes whether an input (e.g., from the network device or the terminal device) was received that corresponds to a request to re-route communications to a different terminal device.

At block 1015, a re-routing condition from a re-routing rule is evaluated, such as by the interaction management engine, based on the one or more characteristics. Generally, the routing condition may be structured so as to be satisfied when it can be estimated that a user is or will be unsatisfied with a communication series, that a communication series is not progressing towards a target issue-resolution stage or is progressing more slowly than desired, or that an agent is or will be unsatisfied with a communication series. The evaluation may include, for example, comparing each of one or more characteristic values to a corresponding threshold and/or determining whether a characteristic matches a particular value (e.g., a categorical or numeric value).

The re-routing condition can include a condition defined by the client, generally defined, and/or learned. For example, a learning algorithm may be established to generate or modify the re-routing condition based on which established message series were terminated by a user action (or agent action) and/or monitoring of a user sentiment, web access, purchasing decisions, etc. during a message series.

In some instances, the re-routing condition may be complementary to the continuous-channel condition evaluated at block 920 of process 900 of FIG. 9. For example, the conditions may be structured such that messages are to be re-routed during a message series when a sentiment score is below a threshold and that a continuous channel is to be established after the message series when a sentiment score remains or is above the threshold. In some instances, a condition to establish a continuous channel is more restrictive than a complement to a re-routing condition. For example, re-routing may be avoided so long as a sentiment score does not decrease by more than 50%, but a continuous channel may be established when a sentiment score increases in a message series by at least 20%.

At block 1020, a determination is made, such as by the interaction management engine, as to whether the re-routing condition is satisfied based on the evaluation. When it is determined that the re-routing condition is not satisfied, process 1000 can return to block 1015.

When it is determined that the re-routing condition is satisfied, process 1000 can continue to block 1025 where a new terminal device can be selected, such as by the interaction management engine. The new terminal device can be selected, for example, using part or all of process 800 of FIG. 8, based on availability, to be biased towards a terminal device associated with more agent experience, a different agent skill (e.g., corresponding to a recent communication-exchange topic) and/or a different agent position.

At block 1030, a dynamic message chronicle can be generated, such as by a message assessment engine (e.g., message assessment engine 615 of FIG. 6). For example, an initial set of messages can be identified. The set can include messages in a single series of messages (and/or session) or, in other instances, from multiple series (e.g., with a single terminal device or multiple terminal devices). In some instances, the messages can include messages associated with a single client. The messages can include messages exclusively sent from a network device, exclusively by one (or multiple) terminal devices or a combination thereof.

In some instances, the message chronicle can be targeted in that it can include messages corresponding to one or more select indices. Generating a targeted message chronicle may include filtering the set of messages. For example, messages associated with an index associated with a particular topic, sentiment (or range of sentiments), issue-resolution stage (or range thereof), and/or time period may be selected for inclusion in the chronicle.

In some instances, a size of the chronicle is limited or specified. For example, a rule may indicate that a chronicle is to include no more than 10 messages, 300 words, or 2000 characters. A chronicle may be sorted and/or multi-dimensional. For example, a dimension of a chronicle may indicate whether a given message is from a network device or terminal device, and messages may be sorted according to a transmission time. This may allow messages to be differentially presented on a given display side based on a source device. Other examples of dimensions can include an issue identifier, a topic, a message-series identifier, and so on.

The message chronicle may be dynamic in that one or more new messages may be dynamically added to the chronicle. For example, a new message be appended to a message chronicle upon receipt (which may, but need not, indicate that the message will be displayed at top/bottom or right/left an end of a chronicle presentation). Adding a new message may, but need not, require or result in deleting one or more other messages in the chronicle (so as to abide by any combination of message, word, or character quantity constraints).

At block 1035, presentation (e.g., at the new terminal device) of the dynamic message chronicle is facilitated, such as by the interaction management engine. For example, a representation of the message chronicle may be locally presented, a presentation including a representation of the message chronicle may be transmitted to the new terminal device or a presentation of data of the message chronicle may be transmitted to the new terminal device.

It will be appreciated that blocks 1030-1035 may be, in part or in their entirety, repeatedly performed. For example, before re-routing has occurred, if a new message is received, a dynamic message chronicle may be updated to include the new message (e.g., by locally generating a new or modified version of the message chronicle or by transmitting the message to a presenting device so as to have the message integrated with the chronicle at a receiving device). A presentation can then be updated so as to include the new message.

In the meantime, new messages can also be sent to the terminal device initially participating in a message series with the terminal device. Thus, two terminal devices may be receiving one or more network-device communications during a period between determining that a re-routing condition is satisfied and completing a re-routing process. Thus, a communication may be duplicated (e.g., by the interaction management engine) so as to reach each device. This strategy can allow an agent associated with the new terminal device to review an ongoing message series before participating in it, so as to reduce the need for a user to re-explain pertinent details, issues, questions, etc.

At block 1040, a re-routing notification is transmitted to the network device or to a display (e.g., when message transmitter interface 660 is operating locally at the network device), such as by a message transmitter interface (e.g., message transmitter interface 660 of FIG. 6). The re-routing notification can indicate that a subsequent message can be or will be routed to a new terminal device. The notification may, but need not, include information about the new terminal device and/or associated agent. The notification may be accompanied with an option to select to proceed with the proposed re-routing and/or not to proceed with the proposed re-routing.

At block 1045, one or more subsequent messages can be directed, such as by a terminal routing engine (e.g., terminal routing engine 650 of FIG. 6) to the new terminal device. These one or more subsequent messages can include messages to which the new terminal device is assigned to respond and/or which the terminal device initially involved in the message series does not receive. The directing can include updating a routing protocol and/or task assignment protocol.

The directing may include releasing the terminal device initially involved in the message series from a task of responding to the messages. The release may occur, for example, in response to detecting a message from the new terminal device directed to the network device; to detecting that a defined time period has elapsed since a transmission or presentation of the dynamic message chronicle; to detecting a communication from the different terminal device indicating that an associated is ready to participate in the interaction; and so on. Releasing the terminal device may include ceasing to transmit new messages from the network device to the terminal device. In some instances, a rule indicates that the terminal device is to continue to receive interaction-associated messages (e.g., so as to prepare an agent associated with the terminal device to provide information if requested or to observe how the interaction is being handled by an agent associated with the new terminal device).

Block 1045 may then, in some instances, be conditionally performed (e.g., only upon receiving a request to proceed with the re-routing; so long as an instruction not to proceed with the re-routing has not been received; and/or only upon receiving an indication from an agent associated with the new terminal device requesting that the directing occur).

Figure 11:
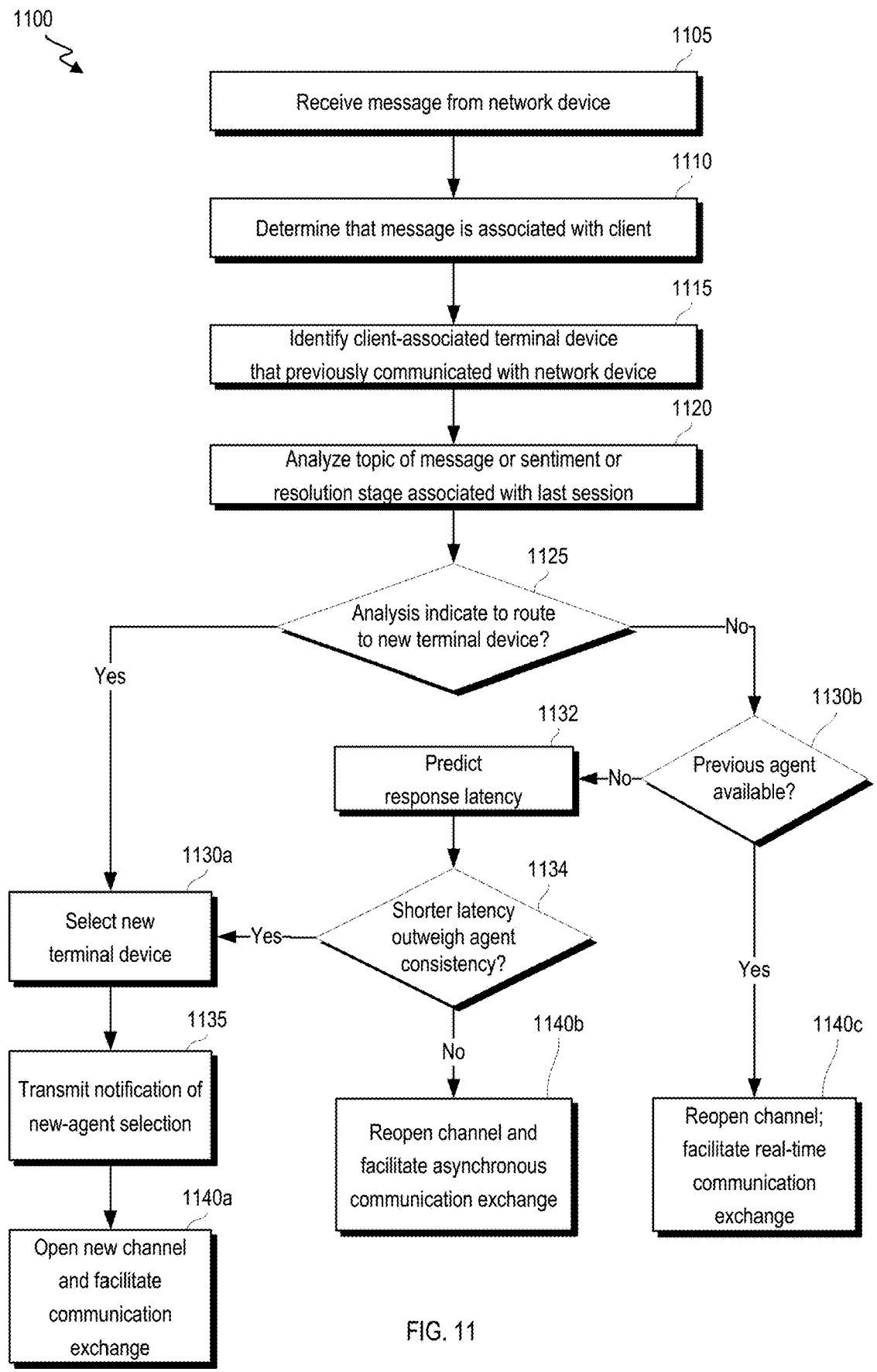
FIG. 11 illustrates a flowchart of an embodiment of a process for dynamically routing electronic messages based on consistency and latency variables.

FIG. 11 illustrates a flowchart of an embodiment of a process 1100 for dynamically routing electronic messages based on consistency and latency variables. Process 1100 can be performed, for example, in part or in its entirety by a connection management system, such as connection management system 150, 350, 450, 520 or 600. Process 1100 can begin at block 1105 where a message receiver interface (e.g., message receiver interface 605 of FIG. 6) receives a message from a network device. The message can include a message initiating a new series of messages or session.

At block 1110, a determination is made, such as by a client mapping engine (e.g., client mapping engine 640 of FIG. 6), that the message is associated with one or more particular clients. In some instances, a the determination can be based on an identifier corresponding to a client (e.g., an identifier of a client, product, service, webpage, or app page). The identifier can be included as part of a message (e.g., which the client mapping engine may detect) or included as other data in a message-inclusive communication. For example, an interface (e.g., in a webpage or app page) presented at a user device may allow a user to select a particular client (or product or service) to indicate that a message relates to or is to be directed to the selected client. A message, as specified by the user, can then be transmitted in association with the selection (e.g., via one or more communications). The identifier can be looked-up, such as by the client mapping engine, in a client data store (e.g., client data store 645 of FIG. 6) to retrieve additional data about the client and/or an identifier of the client.

At block 1115, a terminal device is identified, such as by the interaction management engine, as being associated with the one or more clients that previously communicated with the network device. In one instance, the terminal device can include one associated with a continuous channel involving the network device. In one instance, the terminal device can include one involved in a current or previous message exchange with the network device.

At block 1120, a topic of the message, sentiment, or resolution stage associated with a last session corresponding to a previous message series between the terminal device and the network device is analyzed, such as by the interaction management engine. The topic and/or sentiment can be identified, for example, by retrieving index data (e.g., as set in accordance with a technique described herein, such as via part or all of process 700 of FIG. 7) or by analyzing a stored message or message metadata so as to determine the topic or sentiment (e.g., in accordance with a technique described herein).

In one instance, the analysis can include determining whether a sentiment (e.g., an average sentiment score or final sentiment category) and/or change in sentiment exceeds a threshold and/or matches a value. The sentiment can include an inferred or identified (e.g., via explicit sentiment-identifying input from an agent or user) sentiment of a user associated with the network device or an agent associated with the terminal device. In one instance, the analysis can include determining whether a topic corresponding to the message received at block 1105 one that also corresponded to any or a threshold number of messages in the last session or to the last session in general. In one instance, an issue-resolution stage of a previous message may be analyzed with respect to an issue-resolution stage corresponding to the received message (e.g., to determine whether progress or a setback has been experienced). In some instances, the analysis can include an evaluation of any one of a message parameter, a conversation parameter, a network device parameter, and a continuous communication parameter (see FIG. 14 for further discussion).

It will be appreciated that the analysis performed at block 1120 can relate to additional or alternative features. For example, a type of communication channel associated with a previous message can be compared to that of the received message to determine if they are the same.

At block 1125, a determination is made, such as by the interaction management engine, as to whether the analysis indicates that the message is to be routed to a new (i.e., different) terminal device. This determination can be made by evaluating a condition in a (general or client-specific) routing rule.

Generally, the re-routing condition may be structured so as to be satisfied when it can be estimated that a user or agent associated with the terminal device will be satisfied with a communication series, that a communication series will progress towards a target issue-resolution stage; that a communication series will progress toward a target issue-resolution stage at or faster than a target speed; and/or that an agent associated with the terminal device will be knowledgeable about the issues raised by in network-device communications.

The determination can include determining whether a variable identified at block 1120 (e.g., sentiment score or change in sentiment score) exceeds a threshold or whether an analysis result from block 1120 identifies a match or match score, between a topic of the received message and a topic of a message of the last session, that is above a threshold.

In some instances, the determination can depend on whether a continuous channel is established between the network device and terminal device. For example, a continuous channel's existence may indicate that process 1100 is to proceed from block 1125 to block 1130b.

The routing condition can include one defined by the client, generally defined and/or learned. For example, a learning algorithm may be established to generate or modify the routing condition based on which previous consistent-routing attempts were terminated by a user action, how initiating asynchronous communication exchanges not in real-time affected a sentiment (e.g., of a particular user or of a set of users), etc.

When it is determined that the message is to be routed to a new terminal device, process 1100 continues to block 1130a where the new terminal device is selected, such as by the interaction management engine.

The new terminal device can be selected, for example, using part or all of process 800 of FIG. 8, based on availability (e.g., generally, at a present time and/or with respect to a communication type corresponding to that of the received message) and/or device-associated agent knowledge bases, skills, or positions.

At block 1135, a notification of the new-agent selection is transmitted, such as by a message transmitter interface (e.g., message transmitter interface 660 of FIG. 6), to the network device and/or the new terminal device. The notification can indicate that a subsequent message can be or will be routed to a new terminal device. The notification may, but need not, include information about the new terminal device, agent associated with the new terminal device, network device, user associated with the network device, and/or the message. The notification may include an indication that the communication would not be transmitted to the terminal device with which the network device previously communicated. The notification may include information about the terminal device and/or associated agent. The notification may be accompanied with an option to select corresponding to a request to proceed with the proposed re-routing and/or with an instruction not to proceed with the proposed re-routing (e.g., and to route the communication to the terminal device identified at block 1115).

At block 1140a, a new (e.g., continuous or non-continuous) connection channel can be opened and a communication exchange between the network device and new terminal device can be facilitated, such as by the interaction management engine. Block 1140a may include, for example, transmitting the message to the new terminal device, routing new messages from the network device (e.g., in a same message series) to the new terminal device, routing messages from the new terminal device to the network device, and/or providing information (e.g., an address, IP address, phone number, account data and so on) pertaining to the network device or the new terminal device to the other device, and so on. In one instance, a routing protocol (e.g., specific to a session or message series or one that is more sustained) and/or task assignment may be updated so as to associate the network device with the new terminal device.

Block 1140a may, in some instances, be conditionally performed (e.g., only upon receiving a request to proceed with the routing to the new device; so long as an instruction not to proceed with the proposed new-device routing has not been received; and/or only upon receiving an indication from an agent associated with the new terminal device requesting that the directing occur).

When it is determined that the message is not to be routed to a new terminal device, process 1100 continues to block 1130b where a determination is made, such as by a terminal routing engine (e.g., terminal routing engine 650 of FIG. 6) as to whether an agent associated with the terminal device is available. The determination can include identifying a status of the terminal device (e.g., whether it is online versus offline) and/or determining whether a value pertaining to task assignments assigned to the terminal device (e.g., to participate in communication exchanges) exceeds a threshold. The value can include, for example, a number of assigned tasks, a predicted time that it will take the terminal device to complete one (or another number, such as one plus a number of unattended-to assigned tasks) task assignments and/or an estimated workload based on the task assignments (e.g., summed or averaged across the assignments). The threshold can be a threshold as defined within a rule, such as a general rule, a client-specific rule, a terminal-device-specific rule, a rule defined based (at least in part) on a learning technique (to identify a value that a defined percentage of users will tolerate in a real-time communication exchange without terminating the exchange), etc.

The determination at block 1130b can include determining whether the agent is available to provide a response in real-time to the message and/or with a short delay (e.g., in less than 3 minutes, 1 minute, 30 seconds or 10 seconds). The determination can be based on, for example, a time of having detected a most recent communication (e.g., of any type or of a particular type) from a terminal device associated with the agent, stored working hours of the agent, determining whether the agent has any present communication task assignments, determining a quantity and/or type of any present communication task assignments, detecting whether an affirmative response is received in response to an availability-query communication transmitted to the terminal device, and/or detecting a state or activity of the terminal device (e.g., via remote monitoring).

When it is determined that the agent is not available, process 1100 continues to block 1132 where a response latency is predicted, such as by the terminal routing engine. The response latency may be predicted based on, for example, a number, complexity and/or predicted involvement time (e.g., based on empirical data that may generally predict involvement time or may predict it specifically for a client, topic, time period, issue type, agent, etc.) of communication task assignments currently assigned to the agent. Prediction of the response latency may also or alternatively be based on the agent's working hours, local time, and/or delay estimate provided by the prediction.

At block 1134, a determination is made, such as by the interaction management engine, as to whether a shorter latency outweighs agent consistency. The determination may be made in accordance with a rule. For example, a rule may specify a threshold and indicate that shorter latency outweighs agent consistency when an predicted response latency exceeds the threshold. The threshold may be general or specific to one or more of a client, user, time period, issue type, topic, communication type, and so on. The threshold may be, for example, defined by a client or user or learned. For example, a machine learning technique may identify a threshold that corresponds to a given percentage of users abandoning a message series when a response latency exceeds the threshold.

In one instance, a notification is generated so as to be presented at a network device that informs a user of routing options. The notification may identify the previous agent and the predicted response latency. It may, in some instances, also identify one or more communication-channel types that may be used to communicate with the previous agent or a new agent. The notification may, but need not, identify a default routing strategy (e.g., to the previous agent or to a new agent) absent any contrary instruction. The notification may include an option so as to indicate that the communication should be routed to a network device associated with the new agent and/or an option so as to indicate that the communication should be routed to a new network device. The determination at block 1134 may be made in accordance with any user input received responsive to a notification of this type.

When it is determined that shorter latency does outweigh device consistency, process 1100 continues to block 1130a. When it is determined that shorter latency does outweigh device consistency, process 1100 continues to block 1140b where a connection channel is reopened and a communication exchange is facilitated between the network device and terminal device, such as by the interaction management engine. When it is determined that the agent is available, process 1100 continues to block 1140c where a connection channel is reopened and a real-time communication exchange is facilitated between the network device and terminal device, such as by the interaction management engine.

One or both of blocks 1140b and 1140c can include facilitating a communication exchange by, for example, transmitting the message to the terminal device, routing new messages from the network device (e.g., in a same message series) to the terminal device, routing messages from the terminal device to the network device, and/or providing information (e.g., an address, IP address, phone number, account data and so on) pertaining to the network device or the terminal device to the other device, and so on. In one instance, a routing protocol (e.g., specific to a session or message series or one that is more sustained) and/or task assignment may be updated so as to associate the network device with the terminal device.

A distinction between blocks 1140b and 1140c relates to an expectation of how quickly the terminal device will respond to network-device messages. With respect to block 1140c, responses can be expected to be received quickly and/or in real-time. For example, it may be expected that the terminal device will respond to a network-device message within 1, 3, or 5 minutes. Meanwhile, longer delays may be expected at block 1140b.

Due to the predicted response-latency distinctions, in some instances, a communication exchange facilitated at block 1140b may be of a different type than one facilitated at block 1140c. For example, a communication exchange facilitated at block 1140c may include an online chat or telephone call, and a communication exchange facilitated at block 1140b may include an SMS message exchange, app-based message exchange, or email chain. In some instances, a type of communication exchange facilitated at block 1140b can include an asynchronous exchange, where a user and agent need not be engaging in the exchange at a same time or during a same time period (while such concurrent engagement may be expected in the exchange facilitated at block 1140c). An asynchronous exchange can include, for example, an electronic message exchange (e.g., via an app, web-based message/inbox system, or email) distinct from instant messaging or a chat. An asynchronous exchange can include communicating messages in a manner such that a transmitted message is stored in a message queue or inbox until a destination device requests that the message be presented or is visiting a webpage or app page corresponding to the queue or inbox.

Figure 12:
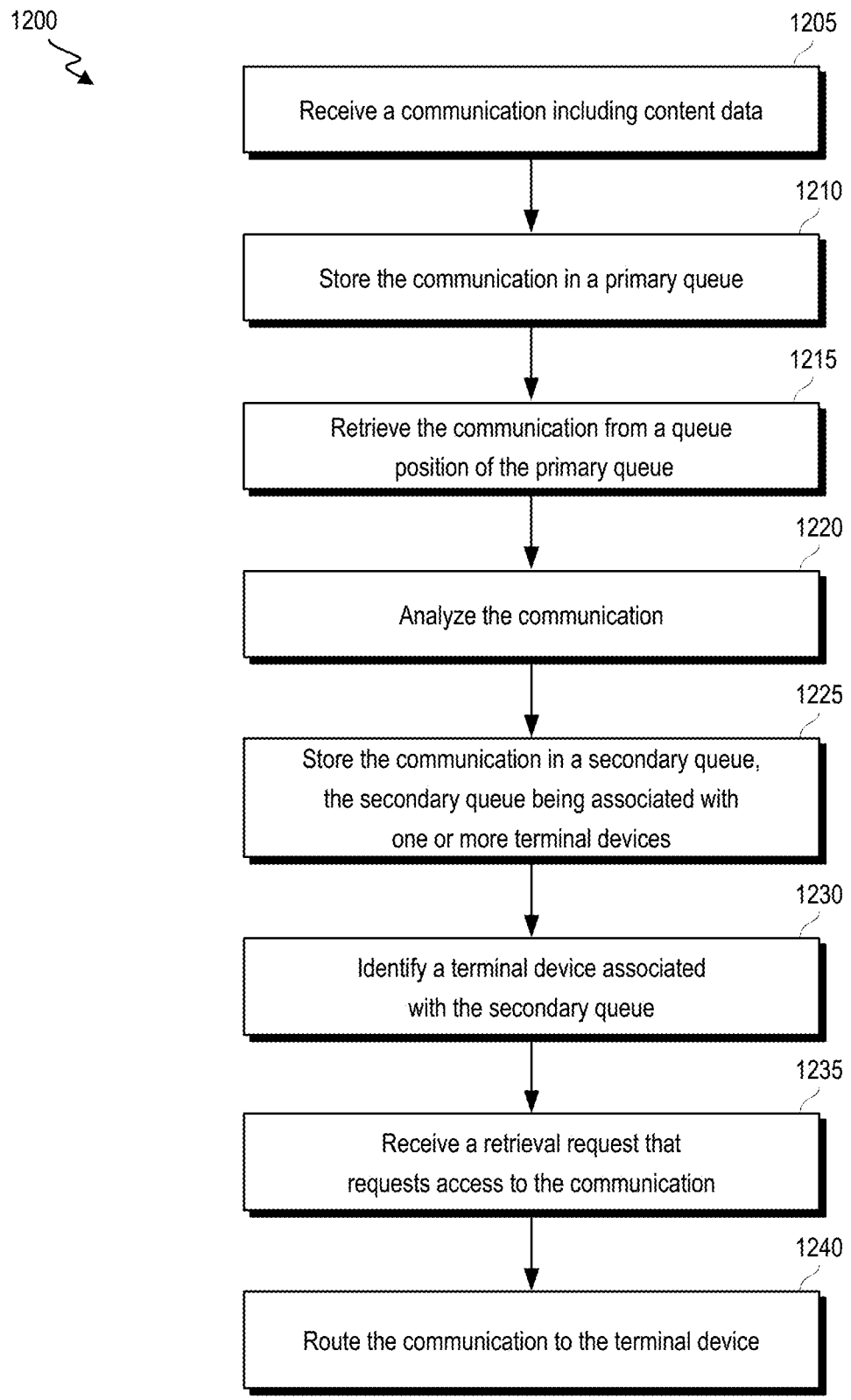
FIG. 12 illustrates a flowchart of an embodiment of a process for routing communications.

FIG. 12 illustrates a flowchart of an embodiment of a process 1200 for routing communications. Process 1200 can be performed, for example, in part or in its entirety by a connection management system, such as connection management system 150, 350, 450, 520 or 600. Process 1200 can begin at block 1205 where a message receiver interface (e.g., message receiver interface 605 of FIG. 6) receives a communication from a network device. The communication may include a message. A message may initiate a new series of messages or communication session. The communication can include content data. In some instances, content data may include various information (e.g., text, images, video, documents (.doc, .pdf, and other suitable documents), and so on). The content data may be generated based on inputs received at the network device transmitting the communication. The content data can also be generated based on information related to or associated with the communication (e.g., IP address, time of transmission, time of receipt, user profile data associated with a user operating the network device, and other suitable information).

At block 1210, upon receiving the communication, the connection management system (e.g., connection management system 150) can store the communication in a primary queue (e.g., primary queue 180). The primary queue can be a data structure that stores various communications received from various network devices. Further, the primary queue can include a plurality of queue positions. The communication received at block 1205 can be stored in one of the queue positions of the plurality of queue positions. In some instances, the primary queue can be a plurality of queues or a combination of various data structures for storing data (e.g., a queue, a data tree, and so on).

At block 1215, the communication may be retrieved from the primary queue. For example, the communication processing system (e.g., communication processing system 182) may retrieve the communication from the primary queue. In some instances, the communication processing system may retrieve the communication in order to process the communication to determine to which terminal device(s) the communication should be routed.

At block 1220, the communication may be analyzed. For example, the communication processing system may analyze the communication. In some instances, analyzing the communication may include parsing the content data for one or more keywords. For example, a keyword may include any combination of text or punctuation data, however, the present disclosure is not limited thereto. In some instances, parsing the content data may include extracting any text in the content data and reading the text to determine whether the text includes a keyword.

In some instances, a keyword may correspond to one or more secondary queues. A secondary queue may be a data structure (similar to the primary queue) that is stored in the connection management system. For example, one or more secondary queues may be queues that are associated with specific keywords. As a non-limiting example, a secondary queue may be associated with the term "password." In this example, all communications that are determined to include the term "password" are stored in the secondary queue that is associated with the term "password." As a further example, if a communication includes the text "I don't know my password." The text can be parsed to determine whether the keyword "password" is included in the text. In this example, the text included in the communication is determined to include the term "password." Accordingly, because the communication includes the keyword "password," the password may be stored in the secondary queue associated with the keyword "password."

In some instances, analyzing the communication can include identifying whether one or more anchors are included in the communication. An anchor can include any combination of text or punctuation that is associated with a negative, neutral, or positive polarity. An anchor can be determined, identified, or generated by a client (e.g., client 125) so that anchors may be specific to each client. In other instances, anchors may be automatically determined based on previous communications (e.g., using supervised machine learning techniques), or may be the same for each client. As a non-limiting example, an anchor may be the phrase "don't like," which may be associated with a negative polarity. When an anchor is identified, the text surrounding the anchor can be analyzed (e.g., three to five words near the identified anchor term in a sentence) for amplifier terms. An amplifier term can increase, maintain, or decrease an intensity of the polarity (e.g., negative, neutral, or positive).

Continuing with this example, if the term "really" is near the anchor "don't like" (e.g., as in the sentence "I really don't like"), the term "really" may be identified as an amplifier term. Upon identifying an amplifier term, the communication processing system can determine that the negative polarity associated with the communication has a high intensity. In this case, a message parameter can be generated based on the identification of the anchor and the associated amplifier term. As a non-limiting example, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. In a further example, if the term "kind of" is near the anchor "don't like" (e.g., as in the sentence "I kind of don't like"), the term "kind of" may be identified as an amplifier term that indicates a medium intensity of the negative polarity. In this case, a message parameter can be generated based on the identification of the medium intensity of the negative polarity. As a non-limiting example, the message parameter can be a numerical value that indicates the medium intensity of the negative polarity (e.g., a message parameter of 40, as opposed to the message parameter of 20). As discussed in the next block (block 1225), in some instances, the message parameter can be used to determine which secondary queue is to store the communication.

At block 1225, the communication may be stored in the secondary queue that is associated with the keyword. In some instances, a secondary queue may correspond to one or more terminal devices. For example, a secondary queue associated with the keyword "password" may correspond to one or more terminal devices, which are operated by agents who are trained to engage with users having password issues.

In some instances, a secondary queue can include one or more secondary queues. Further, in some instances, a secondary queue may be associated with a polarity. For example, a secondary queue can be associated with one or more of a negative polarity (e.g., described herein as a negative secondary queue), a neutral polarity (e.g., described herein as a neutral secondary queue), a positive polarity (e.g., described herein as a positive secondary queue), and so on. As another example, if the communication has a message parameter that indicates a high intensity of a negative polarity, the communication may be stored in a negative secondary queue that is associated with a high intensity. For example, communications associated with a negative polarity may be stored together in a negative secondary queue regardless of intensity, or they may be stored in separate negative secondary queues based on the intensity.

In some instances, when a plurality of communications (e.g., messages) are stored in a secondary queue, the queue positions of the communications in the secondary queue can be reprioritized based on various factors. For example, if an IP address of a message stored in the secondary queue is associated with a high priority, the messages stored in the secondary queue may be rearranged so that the message associated with a high priority is earlier in the queue (e.g., processed earlier than other messages).

At block 1230, a terminal device included in the one or more terminal devices that correspond to the secondary queue (which stores the communication) can be identified. For example, the communication processing system can identify the one or more terminal devices that correspond to the secondary queue storing the communication. Then, the communication processing system can select one of the one or more terminal devices based on various factors. Examples of factors evaluated when considering which terminal device to select from the one or more terminal devices may include predicted response time (e.g., of a terminal device), availability, unavailability, location, knowledge base of an agent associated with the terminal device, terminal device affiliated with a user profile (e.g., a terminal device that previously communication with a network device associated with the communication), and other suitable factors. Examples of a predicted response time can include an amount of time pending before an agent can respond to a communication received from a network device, an unavailability time (e.g., a time an agent is unavailable), and so on.

In some instances, the communication processing system can compare the predicted response time associated with a first terminal device against a threshold value (e.g., a defined time). For example, when the predicted response time for the first terminal device exceeds (e.g., equals or is greater than) the threshold value, the communication processing system can identify a second terminal device, which has a faster response time (e.g., a predicted response time that is lower than the defined threshold value).

At block 1235, a retrieval request may be received from the terminal device identified in block 1230. The retrieval request may be a communication from the identified terminal device that includes data indicative of a request to access the communication stored in the secondary queue. In some instances, upon identifying the terminal device (e.g., at block 1230), the connection management system may route the communication to the terminal device (instead of the terminal device requesting to retrieve the communication).

At block 1240, the communication stored in the secondary queue can be routed to the terminal device requesting access to the communication. In some instances, routing the communication to the identified terminal device may include establishing a communication between the identified terminal device and a network device associated with the communication (e.g., a network device that originally transmitted the communication).

It will be appreciated that, upon receiving a message at the connection management system, a terminal device may be notified of a message associated with a particular polarity (e.g., negative polarity), instead of the message being stored in a secondary queue associated with the particular polarity. For example, if a message received corresponds to a negative polarity, a terminal device (e.g., associated with a managing agent) may receive an alert communication indicating the existence of the message having a negative polarity.

Figure 13:
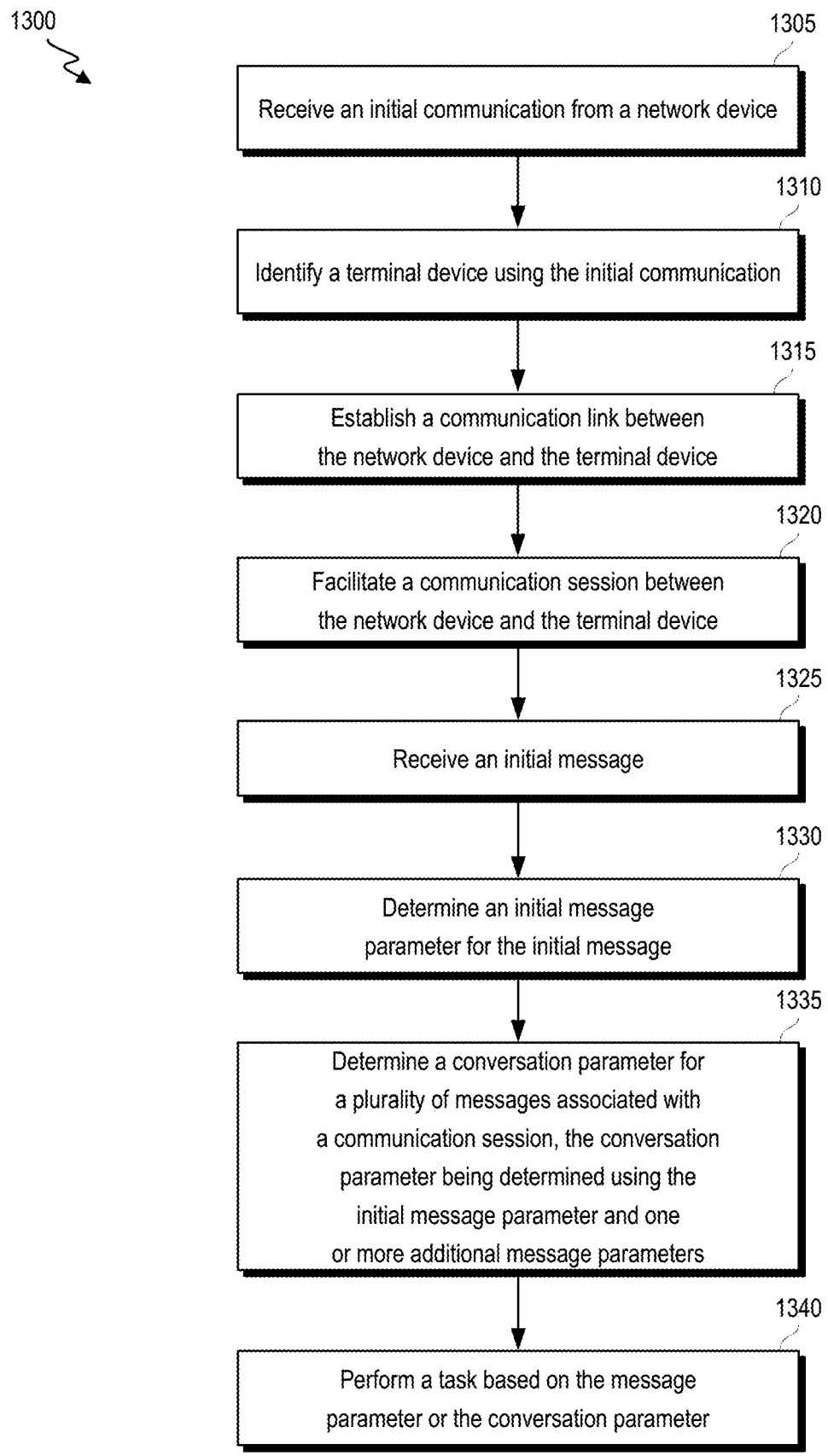
FIG. 13 illustrates a flowchart of an embodiment of a process for performing a task.

FIG. 13 is a flowchart illustrating an embodiment of a process of performing a task. Process 1300 can be performed, for example, in part or in its entirety by a connection management system, such as connection management system 150, 350, 450, 520 or 600. Process 1300 can begin at block 1305 where a message receiver interface (e.g., message receiver interface 605 of FIG. 6) receives an initial communication from a network device. The initial communication may include a message. A message may initiate a new series of messages or communication session. The communication can include content data. In some instances, content data may include various information (e.g., text, images, video, uploaded documents (.doc, .pdf, and other suitable documents), and so on). The content data may be generated based on inputs received at the network device transmitting the communication. The content data can also be generated based on information related to or associated with the communication (e.g., IP address, time of transmission, time of receipt, user profile data associated with a user operating the network device, and other suitable information).

At block 1310, the connection management system may identify a terminal device using the initial communication. In some instances, the connection management system may use the processes described in blocks 1220 through 1230 of FIG. 12 to identify a terminal device (e.g., analyzing the initial communication). In other instances, the connection management system may identify a terminal device which has previously communicated with the network device in block 1310. Further, the terminal device may be associated with a client (e.g., an entity, client 125). At block 1315, the connection management system may establish a communication link between the network device (which transmitted the initial communication) and the terminal device (identified at block 1310). Establishing a communication link between the network device and the terminal device may enable communications (e.g., messages) to be communicated between the network device and the terminal device.

At block 1320, the connection management system may facilitate a communication session between the network device and the terminal device. A communication session may include one or more sessions associated with different time periods, browser sessions, communication-initiation requests, and so on. Further, a communication session may include a plurality of messages communicated (e.g., exchanged) between a network device and a terminal device over an established communication link (e.g., the communication link established at block 1315). A communication session can also include messages communicated between multiple network devices and/or multiple terminal devices.

At block 1325, the connection management system can receive an initial message. In some instances, an initial message may be a communication that is part of the communication session. The initial message may include content data.

At block 1330, the connection management system may generate an initial message parameter for the initial message. The initial message parameter can be generated as discussed at blocks 1220-1230 of FIG. 12. For example, a message parameter can be generated based on the identification of an anchor and an associated amplifier term. In some instances, a message parameter may indicate or represent a polarity (e.g., a characteristic) of a message. Examples of polarities include negative, positive, neutral, angry, frustrated, and so on. In some instances, a polarity may include multiple dimensions (e.g., multiple sentiments). For example, a polarity may correspond to an angry sentiment and a frustrated sentiment. In this example, a message parameter for a message having a polarity with multiple dimensions may include multiple components (e.g., a numerical value representing the angry sentiment, and another numerical value representing the frustrated sentiment). In some instances, the message parameter can be a numerical value that indicates the high intensity of the negative polarity (e.g., a message parameter of 20 on a scale of 0-100, with lower numbers indicating a negative polarity and higher numbers indicating a positive polarity). An algorithm can be used to calculate the message parameter. For example, the algorithm may be based on supervised machine learning techniques. The message parameter can be indicative of a characteristic (sentiment, intent, polarity, and so on) of the message (e.g., a message characteristic).

At block 1335, the connection management system may generate a conversation parameter for a plurality of messages associated with the communication session. For example, a conversation parameter can be generated for a particular conversation (e.g., a set, subset, or group of messages) between a user and an agent. In some instances, a conversation parameter can be generated based on a combination (e.g., a weighted combination, average, exponential moving sum, and other suitable combination) of a plurality of message parameters (corresponding to a plurality of received messages). As a non-limiting example, a conversation parameter can be generated by calculating an exponential moving sum of a first message, a second message, and so on. In this example, an exponential moving sum can be calculated by taking a first-in-time message parameter and multiplying it by a defined factor, and then adding the second-in-time message parameter (e.g., an additional message parameter). An example of a defined factor can be 0.8, however, the present disclosure is not limited thereto. For example, a first-in-time message parameter can be (−1) and a second-in-time message parameter can be (1), the conversation parameter calculated using the exponential moving sum may be (−1)*0.8+(1)=0.2.

It will be appreciated that a technique used for combining two or more message parameters (e.g., when generating the conversation parameter) may be different based on the determined polarity of the messages. For example, if two message parameters each correspond to a negative polarity, the conversation parameter of the two messages can be calculated using an exponential moving sum (or any other technique), whereas, if the two messages each correspond to a positive polarity, the conversation parameter of two message parameters can be calculated using an average of the two message parameters (or any other technique). As another example, if a first message parameter corresponds to a positive polarity and a second message parameter corresponds to a negative polarity, the conversation parameter of the two messages can be calculated using a weighted combination (or any other technique).

In some instances, the conversation parameter can be updated in real-time as new messages are received from the network device (e.g., as discussed in FIG. 14). In some instances, a conversation parameter can be indicative of a conversation characteristic (sentiment, intent, polarity, and so on) of the conversation (e.g., the group of messages, for example, about a particular topic).

In some instances, a network device parameter may be generated (see FIG. 14 for further discussion). For example, a network device parameter can be a combination (e.g., a weighted combination, average, exponential moving sum, and other suitable combination) of all conversation parameters associated with a particular network device. Further, in some instances, a continuous communication parameter can be generated (see FIG. 14 for further discussion). For example, a continuous communication parameter can be a combination (e.g., a weighted combination, average, exponential moving sum, and other suitable combination) of all network device parameters associated with a plurality of network devices.

At block 1340, a task may be performed based on a message parameter, a conversation parameter, a network device parameter, a continuous communication parameter, or any combination thereof. Examples of tasks performed based on the message parameter or conversation may include routing a communication to a particular terminal device; selecting a terminal device that is best suited for communicating with the network device (which transmitted the communication), re-routing a communication to another terminal device, transmitting an alert communication to a terminal device different from the terminal device involved in the communication session with the network device (e.g., transmitting an alert to a managing agent's terminal device), generating a report, and other suitable tasks.

FIG. 14 is a flow diagram illustrating an example process 1400 for generating a continuous communication parameter. Process 1400 can be performed, for example, in part or in its entirety by a connection management system, such as connection management system 150, 350, 450, 520 or 600, or communication processing system 182. Process 1400 can include generation of message parameters, conversation parameters, network device parameters, and continuous communication parameters. Message parameters, conversation parameters, network device parameters, and continuous communication parameters can include scores or numerical values, which are generated based on one or more algorithms.

In some instances, a message parameter can indicate whether the polarity (e.g., sentiment, intent, topic, and so on) of a particular message is negative, neutral, positive, or other suitable polarity. A conversation parameter can indicate whether the polarity of a particular conversation (e.g., a series of message exchanges between the network device and the terminal device about a topic) is negative, neutral, positive, and so on. A network device parameter can indicate whether the polarity of all conversations associated with the network device is negative, neutral, positive, and so on. Lastly, a continuous communication parameter can indicate whether the polarity of all network devices communicating with terminal devices associated with a particular client is negative, neutral, positive, or other suitable polarity.

In process 1400, network device A can transmit one or more messages as part of one or more communication sessions (e.g., sessions associated with different time periods, browser sessions, communication-initiation requests, etc.). The transmission of messages can be facilitated by an application being executed on a mobile device (e.g., a smartphone); a webpage displayed on a desktop; an SMS interaction; an email interaction; a call interaction; and so on. Process 1400 can be performed, for example, in part or in its entirety by a message assessment engine (e.g., message assessment engine 615 of FIG. 6), or communication processing system 182.

In some instances, a message parameter can be generated in real-time for each message transmitted by network device A as the message is received at the connection management system. In the example of process 1400, MP1A corresponds to the message parameter generated for the first message transmitted by network device A, MP2A corresponds to the message parameter generated for the second message transmitted, MP3A corresponds to the message parameter generated for the third message transmitted, MP4A corresponds to the message parameter generated for the fourth message transmitted, and MP5A corresponds to the message parameter generated for the fifth message transmitted. A message parameter can be generated as discussed above with respect to FIGS. 1A-1B (e.g., identifying one or more anchors and calculating a score or numerical value based on the one or more anchors).

MP1A, MP2A, MP3A, MP4A, and MP5A may be dynamically grouped based on one or more factors. Examples of factors considered for grouping may include a topic of a message or series of messages, a sentiment associated with a message (e.g., a negative, neutral, or positive polarity), a completion of a conversation between the user and the agent, a level of resolution of an issue indicated in one or more messages of the communication session, and other suitable factors. In some instances, as a message is received at the connection management system, the message may be grouped immediately in real-time. A group of messages may include a subset of messages of the set of messages included in the communication session.

In some instances, a conversation parameter may be generated in real-time for each group (e.g., a particular conversation) of messages. For example, as illustrated in FIG. 14, CP 1405 can be generated based on a combination (e.g., a weighted combination, average, exponential moving sum, and other suitable combination) of message parameters MP1A, MP2A, and MP3A. As a non-limiting example, CP 1405 can be generated by calculating an exponential moving sum of MP1A, MP2A, and MP3A. Similarly, CP 1410 can be generated based on a combination of message parameters MP4A and MP5A. A conversation parameter may be updated in real-time as new messages are received at the connection management system. For example, CP 1405 originally was generated based on MP1A and MP2A before MP3 was generated (e.g., before the third message was received at the connection management system). Upon receiving the third message and generating MP3A, CP 1405 can be updated using, for example, an exponential moving sum equation.

In some instances, a network device parameter (NDP) can be generated in real-time based on the generated conversation parameters. For example, NDP 1415 can be a combination (e.g., a weighted combination, average, exponential moving sum, and other suitable combinations) of CP 1405 and CP 1410. Further, NDP 1415 can be automatically updated as new conversation parameters are generated (e.g., as new messages are received at the connection management system).

In some instances, a message parameter can be generated in real-time for each message transmitted by network device B as the message is received at the connection management system. In the example of process 1400, MP1B corresponds to the message parameter generated for the first message transmitted by network device B, MP2B corresponds to the message parameter generated for the second message transmitted, MP3B corresponds to the message parameter generated for the third message transmitted, MP4B corresponds to the message parameter generated for the fourth message transmitted, MP5B corresponds to the message parameter generated for the fifth message transmitted, and MP6B corresponds to the message parameter generated for the sixth message transmitted.

MP1B, MP2B, MP3B, MP4B, MP5B, and MP6B may be dynamically grouped based on one or more factors, as discussed above. As illustrated in FIG. 14, CP 1420 can be generated based on message parameters MP1B and MP2B. CP 1420 can be a combination (e.g., a weighted combination, average, exponential moving sum, and other suitable combination) of MP1B and MP2B. Similarly, CP 1425 can be generated based on message parameters MP3B and MP4B, and CP 1430 can be generated based on message parameters MP5B and MP6B. In some instances, CP's 1420, 1425, and 1430 may be updated in real-time as new messages are received at the connection management system, as discussed above.

Further, NDP 1435 can be generated in real-time as a combination (e.g., a weighted combination, average, exponential moving sum, and other suitable combinations) of CP's 1420, 1425, and 1430. Further, NDP 1435 can be automatically updated as new conversation parameters are generated (e.g., as new messages are received at the connection management system).

A continuous communication parameter (CCP 1440) can be generated based on a combination (e.g., a weighted combination, average, exponential moving sum, and other suitable combination) of NDP 1415 and NDP 1435. Further, CCP 1440 can be automatically updated as new network device parameters are generated (e.g., as new messages are received at the connection management system).

The connection management system can perform one or more actions based on message parameters, conversation parameters, network device parameters, and/or continuous communication parameters. In some instances, the connection management system can re-route an existing communication between a network device and a terminal device to another terminal device based on the conversation parameters. For example, if a conversation parameter indicates that a series of messages communicated between the network device and the terminal device has a negative polarity, the connection management system can re-route the next message from the network device to a different terminal device. In some instances, when a network device parameter indicates that a particular network device is associated with a negative polarity, the connection management system can transmit an alert message to a managing terminal device (e.g., a terminal device associated with a manager of a plurality of agents). In other instances, a network device parameter can be used to evaluate the performance of an agent associated with a terminal device. For example, a terminal device that is consistently associated with conversation parameters indicating a positive polarity may correspond to a positive performance.

It will be appreciated that a terminal device parameter can be generated in a manner similar to generating a network device parameter. For example, a terminal device parameter can be indicative of a performance of an agent associated with a terminal device. In this example, a terminal device parameter can be generated by analyzing the response communications transmitted from the terminal device to the network device (e.g., in response to a communication received from a network device). Similarly, it will be appreciated that message parameters, conversation parameters, terminal device parameters, and continuous communication parameters can be generated for a terminal device based on communications originating from the terminal device (as opposed to messages received from the network device).

Figure 15A:
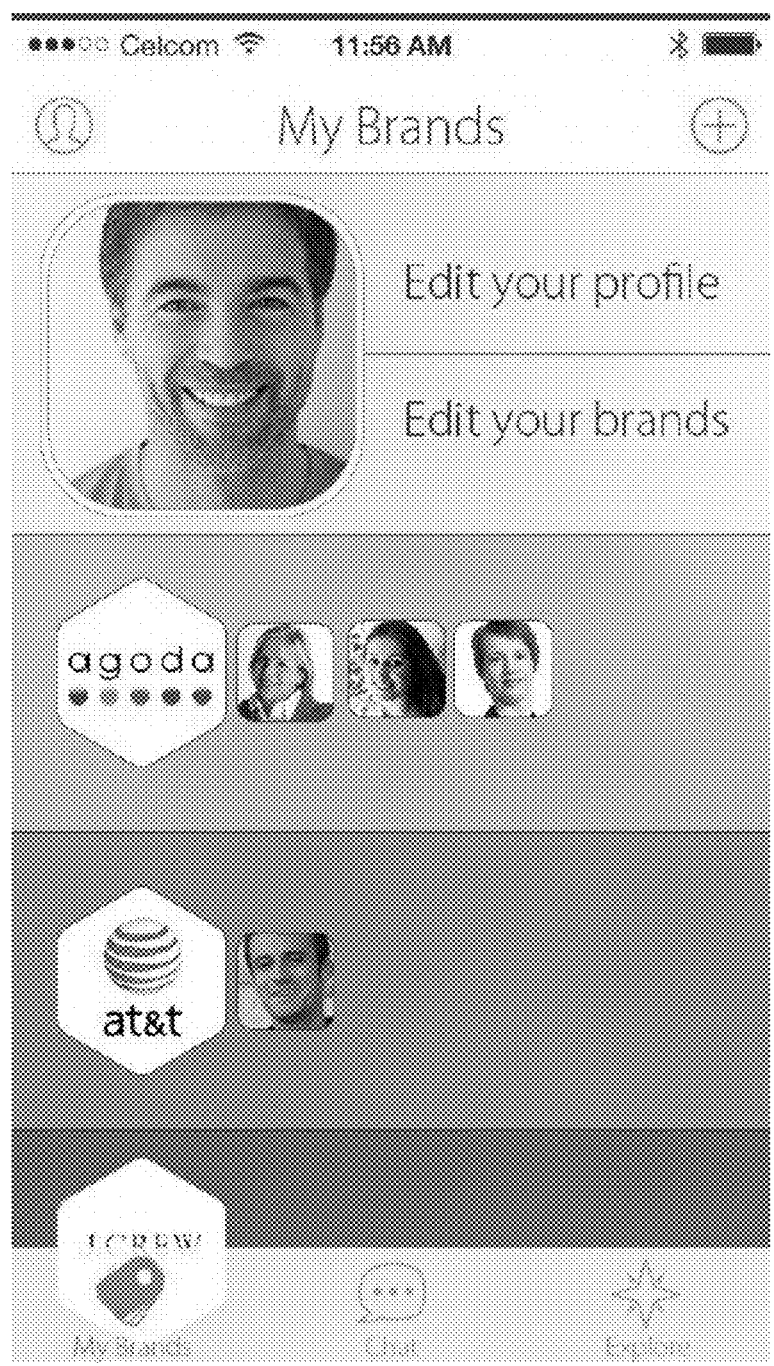
FIGS. 15A-D illustrate examples of interfaces representing various aspects of connecting with terminal devices according to an embodiment.

FIGS. 15A-D illustrate examples of interfaces representing various aspects of connecting with terminal devices according to an embodiment. FIG. 15A shows an example of an interface identifying three clients. For a first client, three continuous channels have been established between a user's network device and a client-associated terminal device. For a second client, a single continuous channel has been established. For a third client, no continuous channels have been established.

Each continuous channel is identified in the interface. In the depicted instance, each channel is identified via a picture of an agent associated with the continuous channel. The interface can allow a user to communicate with an identified agent by clicking on a channel representation.

Figure 15B:

FIG. 15B shows an example of an interface of message exchange (e.g., presented in response to detecting a selection of a particular continuous-channel representation, or in response to detecting other input indicative of a request to engage in a message exchange) between a network device and terminal device. Depending on the embodiment and circumstance, the message exchange can include a real-time message exchange or asynchronous message exchange that allows for parties to be engaged in the exchange during different and/or non-overlapping times.

Figure 15C:

FIG. 15C shows an example of an interface including representations of various communication exchanges related to different topics. Each representation includes a targeted message chronicle that pertains to an identified topic. Messages associated with the topic can include messages from all or part of one or more message-exchange sessions. In one instance, selecting a representation of a topic can initiate an opening or reopening of a continuous connection with a terminal device previously involved in a topic-associated message exchange. In one instance, selecting a representation of a topic can initiate an opening of a communication with a different terminal device, but a subsequent communication exchange can be appended to the previous communication exchange to seamlessly bridge the exchanges. Further, the previous topic-targeted exchange can be transmitted via a message chronicle to the different terminal device.

It will be appreciated that the topics can correspond to topics selected from amongst a defined category. In one instance, however, topics can correspond to open-ended tags. Thus, following a message exchange, a user may be able to provide input selecting an existing tag or identifying a new tag. In this manner, a user can define how to aggregate messages in a desired manner.

Figure 15D:
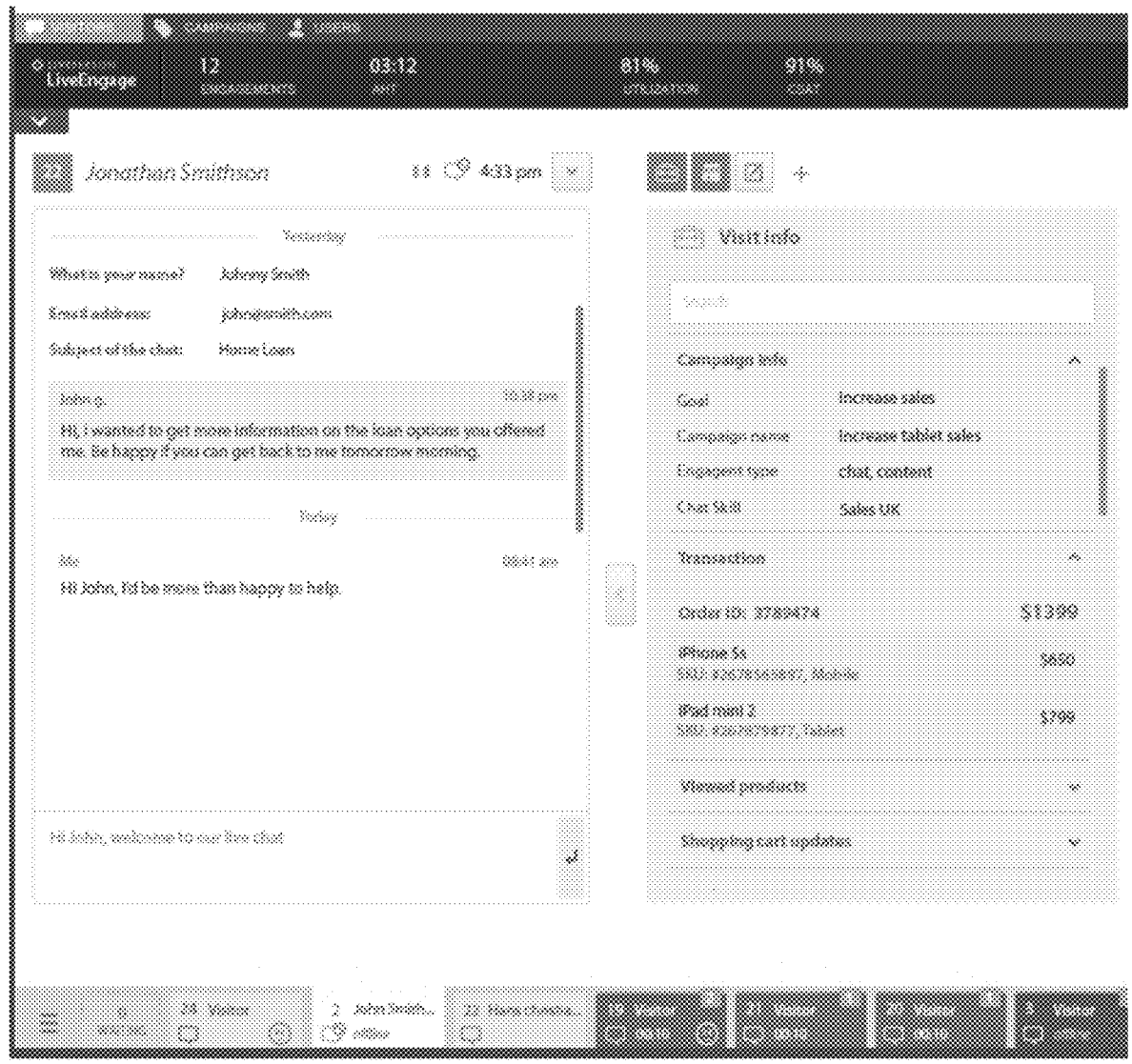

FIG. 15D shows an example of an interface that can be presented at a terminal device to facilitate participation in a message exchange. In the depicted instance, a terminal device is engaged in 12 message series. Data pertaining to one series (relating to user John Smith) is presented in a primary window. The window shows a name of the user, topic (or subject), and a message chronicle (which, in the depicted instance, is separated based source device and includes only one transmitted message from each device). The interface also includes data related to targets for the interaction (to "Increase sales"), an identification of communication type ("chat") and user-account data (order data).

The interface further includes representation of other interactions (e.g., "24 Visitor", "22 Hans Christian . . . ", etc.). A representation can identify how many (if any) unviewed messages have been received from a network device involved in the interaction, a time since a last response, and a sentiment representation.

Thus, it will be appreciated that establishing a real-time (and/or, in some instances, asynchronous) communication exchange between a network device and terminal device can include adding a representation of the exchange and/or network device to an interface to be presented at the terminal device.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method, comprising:
   detecting an interaction between a network device and a terminal device, wherein the interaction corresponds to a set of messages transmitted during a communications session between the network device and the terminal device, and wherein the interaction corresponds to a trend in a particular dimension;
   identifying one or more topics associated with the interaction, wherein the one or more topics are identified based on content corresponding to the set of messages;
   determining one or more inferred sentiment scores associated with the interaction, wherein the one or more inferred sentiment scores are determined based on the set of messages;
   generating one or more message indices based on the one or more topics and the one or more inferred sentiment scores, wherein the one or more message indices include subsets of the set of messages;
   identifying a message index from the one or more message indices, wherein the message index is identified in accordance with a rule;
   generating a message chronicle, wherein the message chronicle includes one or more messages associated with the message index identified from the one or more message indices; and
   analyzing the message chronicle to characterize a presence of the trend in the particular dimension.

2. The computer-implemented method of claim 1, wherein the one or more inferred sentiment scores are determined according to a size of the set of messages, a speed of constructing the set of messages, an inter-message latency, or a detected input associated with the interaction.

3. The computer-implemented method of claim 1, wherein the particular dimension corresponds to a sentiment associated with the one or more messages included in the message chronicle.

4. The computer-implemented method of claim 1, wherein generating the message chronicle includes:
   retrieving the one or more messages, wherein the one or more messages are retrieved based on the message index; and ordering the one or more messages based on one or more dimensions associated with the one or more messages.

5. The computer-implemented method of claim 1, wherein determining the one or more inferred sentiment scores includes:
performing a clustering logical analysis of the set of messages to classify the set of messages, wherein the set of messages are classified according to a set of sentiments.

6. The computer-implemented method of claim 1, wherein identifying the one or more topics includes:
performing a semantic analysis of the content corresponding to the set of messages to extract one or more keywords associated with the set of messages; and
using the one or more keywords to identify the one or more topics.

7. The computer-implemented method of claim 1, further comprising:
detecting a new message associated with the communications session;
determining that the new message corresponds to the message index; and
dynamically updating the message chronicle to add the new message to the one or more messages.

8. A system, comprising:
one or more processors; and
memory storing thereon instructions that, as a result of being executed by the one or more processors, cause the system to:
detect an interaction between a network device and a terminal device, wherein the interaction corresponds to a set of messages transmitted during a communications session between the network device and the terminal device, and wherein the interaction corresponds to a trend in a particular dimension;
identify one or more topics associated with the interaction, wherein the one or more topics are identified based on content corresponding to the set of messages;
determine one or more inferred sentiment scores associated with the interaction, wherein the one or more inferred sentiment scores are determined based on the set of messages;
generate one or more message indices based on the one or more topics and the one or more inferred sentiment scores, wherein the one or more message indices include subsets of the set of messages;
identify a message index from the one or more message indices, wherein the message index is identified in accordance with a rule;
generate a message chronicle, wherein the message chronicle includes one or more messages associated with the message index identified from the one or more message indices; and
analyze the message chronicle to characterize a presence of a trend in a particular dimension.

9. The system of claim 8, wherein the one or more inferred sentiment scores are determined according to a size of the set of messages, a speed of constructing the set of messages, an inter-message latency, or a detected input associated with the interaction.

10. The system of claim 8, wherein the particular dimension corresponds to a sentiment associated with the one or more messages included in the message chronicle.

11. The system of claim 8, wherein the instructions that cause the system to generate the message chronicle further cause the system to:
retrieve the one or more messages, wherein the one or more messages are retrieved based on the message index; and
order the one or more messages based on one or more dimensions associated with the one or more messages.

12. The system of claim 8, wherein the instructions that cause the system to determine the one or more inferred sentiment scores further cause the system to:
perform a clustering logical analysis of the set of messages to classify the set of messages, wherein the set of messages are classified according to a set of sentiments.

13. The system of claim 8, wherein the instructions that cause the system to identify the one or more topics further cause the system to:
perform a semantic analysis of the content corresponding to the set of messages to extract one or more keywords associated with the set of messages; and
use the one or more keywords to identify the one or more topics.

14. The system of claim 8, wherein the instructions further cause the system to:
detect a new message associated with the communications session;
determine that the new message corresponds to the message index; and
dynamically update the message chronicle to add the new message to the one or more messages.

15. A non-transitory, computer-readable storage medium storing thereon executable instructions that, as a result of being executed by one or more processors of a computer system, cause the computer system to:
detect an interaction between a network device and a terminal device, wherein the interaction corresponds to a set of messages transmitted during a communications session between the network device and the terminal device, and wherein the interaction corresponds to a trend in a particular dimension;
identify one or more topics associated with the interaction, wherein the one or more topics are identified based on content corresponding to the set of messages;
determine one or more inferred sentiment scores associated with the interaction, wherein the one or more inferred sentiment scores are determined based on the set of messages;
generate one or more message indices based on the one or more topics and the one or more inferred sentiment scores, wherein the one or more message indices include subsets of the set of messages;
identify a message index from the one or more message indices, wherein the message index is identified in accordance with a rule;
generate a message chronicle, wherein the message chronicle includes one or more messages associated with the message index identified from the one or more message indices; and
analyze the message chronicle to characterize a presence of a trend in a particular dimension.

16. The non-transitory, computer-readable storage medium of claim 15, wherein the one or more inferred sentiment scores are determined according to a size of the set of messages, a speed of constructing the set of messages, an inter-message latency, or a detected input associated with the interaction.

17. The non-transitory, computer-readable storage medium of claim 15, wherein the particular dimension corresponds to a sentiment associated with the one or more messages included in the message chronicle.

18. The non-transitory, computer-readable storage medium of claim 15, wherein the executable instructions that cause the computer system to generate the message chronicle further cause the computer system to:
- retrieve the one or more messages, wherein the one or more messages are retrieved based on the message index; and
- order the one or more messages based on one or more dimensions associated with the one or more messages.

19. The non-transitory, computer-readable storage medium of claim 15, wherein the executable instructions that cause the computer system to determine the one or more inferred sentiment scores further cause the computer system to:
- perform a clustering logical analysis of the set of messages to classify the set of messages, wherein the set of messages are classified according to a set of sentiments.

20. The non-transitory, computer-readable storage medium of claim 15, wherein the executable instructions that cause the computer system to identify the one or more topics further cause the computer system to:
- perform a semantic analysis of the content corresponding to the set of messages to extract one or more keywords associated with the set of messages; and
- use the one or more keywords to identify the one or more topics.

21. The non-transitory, computer-readable storage medium of claim 15, wherein the executable instructions further cause the computer system to:
- detect a new message associated with the communications session;
- determine that the new message corresponds to the message index; and
- dynamically update the message chronicle to add the new message to the one or more messages.

* * * * *